United States Patent
Urban et al.

(10) Patent No.: US 11,912,958 B2
(45) Date of Patent: Feb. 27, 2024

(54) METHODS OF REFINING A GRAIN OIL COMPOSITION

(71) Applicant: POET RESEARCH, INC., Sioux Falls, SD (US)

(72) Inventors: Shannon S. Urban, Valley Springs, SD (US); Cory J. Sarks, Sioux Falls, SD (US); Brett A. Flittie, Harrisburg, SD (US); Jacob A Milbrandt, Tyndall, SD (US); Steven T. Bly, Sioux Falls, SD (US); Alex T. Mccurdy, Sioux Falls, SD (US)

(73) Assignee: POET RESEARCH, INC., Sioux Falls, SD (US)

( * ) Notice: Subject to any disclaimer, the term of this patent is extended or adjusted under 35 U.S.C. 154(b) by 0 days.

(21) Appl. No.: 18/153,852

(22) Filed: Jan. 12, 2023

(65) Prior Publication Data
US 2023/0151296 A1    May 18, 2023

Related U.S. Application Data

(63) Continuation of application No. 18/056,484, filed on Nov. 17, 2022, which is a continuation of application
(Continued)

(51) Int. Cl.
*C11B 13/00*    (2006.01)
*C11B 1/04*    (2006.01)
(Continued)

(52) U.S. Cl.
CPC ............... *C11B 13/00* (2013.01); *C11B 1/04* (2013.01); *C11B 1/14* (2013.01); *C11B 1/16* (2013.01);
(Continued)

(58) Field of Classification Search
CPC ... C11B 13/00; C11B 1/04; C11B 1/14; C11B 1/16; C11B 3/008; C11B 3/12;
(Continued)

(56) References Cited

U.S. PATENT DOCUMENTS

| | | |
|---|---|---|
| 1,247,782 A | 11/1917 | Ayres |
| 1,737,402 A | 11/1929 | Ayres |

(Continued)

FOREIGN PATENT DOCUMENTS

| | | |
|---|---|---|
| BR | PI0704791 A2 | 7/2009 |
| EP | 0265834 A1 | 5/1988 |

(Continued)

OTHER PUBLICATIONS

Micro-fine silica treated with an organic silicone compound, Dumacil® 100 FGK, Elementis Specialties, Apr. 2017, 1 page.
(Continued)

*Primary Examiner* — Deborah D Carr
(74) *Attorney, Agent, or Firm* — Honigman LLP

(57) ABSTRACT

The present disclosure relates methods and systems for refining grain oil compositions using water, and related compositions produced therefrom. The present disclosure also relates to methods of using said compositions. The present disclosure also relates to methods of using grain oil derived from a fermentation product in an anti-foam composition.

26 Claims, 16 Drawing Sheets

Related U.S. Application Data

No. 17/026,771, filed on Sep. 21, 2020, now Pat. No. 11,530,369, which is a continuation of application No. 16/437,960, filed on Jun. 11, 2019, now Pat. No. 10,851,327.

(60) Provisional application No. 62/817,789, filed on Mar. 13, 2019, provisional application No. 62/814,006, filed on Mar. 5, 2019, provisional application No. 62/683,347, filed on Jun. 11, 2018.

(51) Int. Cl.

| | | |
|---|---|---|
| *C11B 1/14* | (2006.01) | |
| *C11B 1/16* | (2006.01) | |
| *C11B 3/00* | (2006.01) | |
| *C11B 3/12* | (2006.01) | |
| *C11B 7/00* | (2006.01) | |
| *C11B 3/16* | (2006.01) | |

(52) U.S. Cl.
CPC ............... *C11B 3/008* (2013.01); *C11B 3/12* (2013.01); *C11B 3/16* (2013.01); *C11B 7/0066* (2013.01)

(58) Field of Classification Search
CPC . C11B 3/16; C11B 7/0066; C11B 3/00; C11B 3/006; Y02E 50/10; Y02W 30/74
See application file for complete search history.

(56) References Cited

U.S. PATENT DOCUMENTS

| | | |
|---|---|---|
| 2,510,379 A | 6/1950 | Christenson |
| 2,510,402 A | 6/1950 | Johnston |
| 2,762,780 A | 9/1956 | Kulakow |
| 2,881,195 A | 4/1959 | Hayes |
| 3,354,188 A | 11/1967 | Bock |
| 4,049,686 A | 9/1977 | Ringers et al. |
| 4,239,096 A | 12/1980 | Smilgys et al. |
| 4,609,500 A | 9/1986 | Strecker |
| 4,698,185 A | 10/1987 | Dijkstra et al. |
| 4,713,155 A | 12/1987 | Arutjunian et al. |
| 5,208,054 A | 5/1993 | Torii et al. |
| 5,239,096 A | 8/1993 | Rohdenburg et al. |
| 5,512,691 A | 4/1996 | Barnicki et al. |
| 5,516,924 A | 5/1996 | van de Sande et al. |
| 6,015,915 A | 1/2000 | Jamil et al. |
| 6,033,706 A | 3/2000 | Silkeberg et al. |
| 6,074,863 A | 6/2000 | Svendsen et al. |
| 6,103,918 A | 8/2000 | Dahlen |
| 6,407,271 B1 | 6/2002 | Deffense |
| 6,426,423 B1 | 7/2002 | Copeland et al. |
| 6,514,332 B2 | 2/2003 | Varnadoe et al. |
| 6,743,930 B2 | 6/2004 | Li |
| 6,764,542 B1 | 7/2004 | Lackey et al. |
| 6,776,832 B2 | 8/2004 | Spence et al. |
| 6,844,458 B2 | 1/2005 | Copeland et al. |
| 6,924,381 B2 | 8/2005 | Dawson |
| 7,122,216 B2 | 10/2006 | Copeland et al. |
| 7,582,458 B2 | 9/2009 | Grichko |
| 7,601,858 B2 | 10/2009 | Cantrell et al. |
| 7,696,369 B2 | 4/2010 | Kellens et al. |
| 7,713,727 B2 | 5/2010 | Dayton et al. |
| 7,842,484 B2 | 11/2010 | Lewis |
| 7,879,917 B2 | 2/2011 | Cheng et al. |
| 7,893,115 B2 | 2/2011 | Cheng et al. |
| 7,919,291 B2 | 4/2011 | Lewis et al. |
| 8,008,516 B2 | 8/2011 | Cantrell et al. |
| 8,076,123 B2 | 12/2011 | Chou |
| 8,114,926 B2 | 2/2012 | Dupuis et al. |
| 8,163,059 B2 | 4/2012 | Tran et al. |
| 8,232,418 B1 | 7/2012 | Bilbie et al. |
| 8,435,766 B2 | 5/2013 | Kellens et al. |
| 8,476,047 B2 | 7/2013 | Burlew et al. |
| 8,608,845 B2 | 12/2013 | Naidoo et al. |
| 8,702,819 B2 | 4/2014 | Bootsma |
| 8,759,044 B2 | 6/2014 | DiCosimo et al. |
| 8,765,425 B2 | 7/2014 | Dicosimo et al. |
| 8,765,985 B2 | 7/2014 | Hora et al. |
| 8,808,445 B2 | 8/2014 | Coe |
| 8,901,330 B2 | 12/2014 | Doyle et al. |
| 8,962,059 B1 | 2/2015 | Froderman et al. |
| 9,045,712 B2 | 6/2015 | Dayton et al. |
| 9,061,987 B2 | 6/2015 | Bootsma |
| 9,109,179 B2 | 8/2015 | Cowin et al. |
| 9,139,803 B2 | 9/2015 | Redford |
| 9,144,758 B2 | 9/2015 | Wang et al. |
| 9,228,211 B2 | 1/2016 | Soe et al. |
| 9,255,239 B1 | 2/2016 | Wiese |
| 9,290,728 B2 | 3/2016 | Bootsma |
| 9,340,749 B1 | 5/2016 | Kozyuk et al. |
| 9,388,100 B2 | 7/2016 | Redford |
| 9,416,274 B2 | 8/2016 | Frank |
| 9,453,180 B2 | 9/2016 | Kozyuk et al. |
| 9,481,794 B2 | 11/2016 | Cox |
| 9,481,853 B2 | 11/2016 | Gordon et al. |
| 9,534,182 B1 | 1/2017 | Ballard |
| 9,534,184 B2 | 1/2017 | Thompson et al. |
| 9,556,399 B2 | 1/2017 | Kozyuk et al. |
| 9,617,425 B1 | 4/2017 | Moriyasu et al. |
| 9,695,449 B2 | 7/2017 | Bootsma |
| 9,765,280 B2 | 9/2017 | Kurth et al. |
| 9,783,458 B2 | 10/2017 | Martin |
| 9,896,643 B2 | 2/2018 | Redford |
| 9,961,916 B2 | 5/2018 | Arhancet et al. |
| 10,087,397 B2 | 10/2018 | Phillips et al. |
| 10,113,187 B2 | 10/2018 | Bushong et al. |
| 10,167,390 B2 | 1/2019 | Cox |
| 10,323,148 B1 | 6/2019 | Brewster et al. |
| 10,526,564 B2 | 1/2020 | Phillips et al. |
| 10,526,623 B2 | 1/2020 | Bootsma |
| 10,584,304 B2 | 3/2020 | Schnell et al. |
| 10,604,776 B2 | 3/2020 | McCurdy et al. |
| 10,683,479 B2 | 6/2020 | Lucas |
| 10,711,221 B2 | 7/2020 | Lamprecht et al. |
| 10,781,464 B2 | 9/2020 | Yoshida et al. |
| 10,815,430 B2 | 10/2020 | Gutierrez et al. |
| 10,815,506 B2 | 10/2020 | Rancke-Madsen et al. |
| 10,851,327 B2 | 12/2020 | Urban et al. |
| 11,008,531 B2 | 5/2021 | Lamprecht et al. |
| 11,268,062 B2 | 3/2022 | Lucas |
| 11,530,369 B2 | 12/2022 | Urban et al. |
| 2004/0063184 A1 | 4/2004 | Grichko |
| 2006/0041152 A1 | 2/2006 | Cantrell et al. |
| 2006/0089429 A1 | 4/2006 | Buras et al. |
| 2006/0215483 A1 | 9/2006 | Helf |
| 2008/0064889 A1 | 3/2008 | Palacios |
| 2008/0146851 A1 | 6/2008 | Schonemann et al. |
| 2008/0176298 A1 | 7/2008 | Randhava et al. |
| 2008/0314294 A1 | 12/2008 | White et al. |
| 2009/0137705 A1 | 5/2009 | Faucon Dumont et al. |
| 2009/0306419 A1 | 12/2009 | Myong et al. |
| 2010/0034586 A1 | 2/2010 | Bailey et al. |
| 2010/0058649 A1 | 3/2010 | Bootsma |
| 2011/0086149 A1 | 4/2011 | Bootsma |
| 2012/0060722 A1 | 3/2012 | Montpeyroux et al. |
| 2012/0245370 A1 | 9/2012 | Sheppard et al. |
| 2013/0109873 A1 | 5/2013 | Bootsma |
| 2013/0157324 A1 | 6/2013 | Dicosimo et al. |
| 2014/0230693 A1 | 8/2014 | Gonzalez Leon et al. |
| 2015/0230488 A1 | 8/2015 | de Man et al. |
| 2015/0291923 A1 | 10/2015 | Bootsma |
| 2016/0145650 A1 | 5/2016 | Lewis et al. |
| 2017/0022364 A1 | 1/2017 | Cox |
| 2017/0066995 A1 | 3/2017 | Borst et al. |
| 2017/0107449 A1 | 4/2017 | Hruschka et al. |
| 2017/0107452 A1 | 4/2017 | Dasari et al. |
| 2017/0145642 A1 | 5/2017 | Swanson |
| 2017/0283838 A1 | 10/2017 | Bootsma |
| 2018/0273988 A1 | 9/2018 | Lewis et al. |
| 2018/0340067 A1 | 11/2018 | McCurdy et al. |
| 2018/0340068 A1 | 11/2018 | McCurdy et al. |
| 2018/0340197 A1 | 11/2018 | McCurdy et al. |

(56) References Cited

U.S. PATENT DOCUMENTS

| | | |
|---|---|---|
| 2019/0249109 A1 | 8/2019 | Lamprecht et al. |
| 2019/0376002 A1 | 12/2019 | Urban et al. |
| 2020/0063168 A1 | 2/2020 | Bootsma |
| 2020/0131403 A1 | 4/2020 | McCurdy |
| 2020/0165642 A1 | 5/2020 | McCurdy et al. |
| 2020/0299610 A1 | 9/2020 | Marques De Lima |
| 2021/0032564 A1 | 2/2021 | Urban et al. |
| 2022/0186171 A1 | 6/2022 | Lucas |

FOREIGN PATENT DOCUMENTS

| | | |
|---|---|---|
| EP | 2689006 A2 | 1/2014 |
| EP | 2264157 B1 | 5/2014 |
| GB | 481580 A | 3/1938 |
| GB | 766394 A | 1/1957 |
| GB | 1065720 A | 4/1967 |
| GB | 1562380 A | 3/1980 |
| JP | 2005154467 | 6/2005 |
| JP | 4257188 B2 | 4/2009 |
| WO | 880277 5 A1 | 4/1988 |
| WO | 9323508 A1 | 11/1993 |
| WO | 9421762 A1 | 9/1994 |
| WO | 9801518 A1 | 1/1998 |
| WO | 2004007654 A1 | 1/2004 |
| WO | 2008061120 A2 | 5/2008 |
| WO | 2009120419 A1 | 10/2009 |
| WO | 2010053244 A1 | 5/2010 |
| WO | 2010077141 A1 | 7/2010 |
| WO | 2012109221 A1 | 8/2012 |
| WO | 2014037008 A1 | 3/2014 |
| WO | 2014053870 A1 | 4/2014 |
| WO | 2014158011 A1 | 10/2014 |
| WO | 2015168020 A2 | 11/2015 |
| WO | 2015181308 A1 | 12/2015 |
| WO | 2016003465 A1 | 1/2016 |
| WO | 2016149692 A1 | 9/2016 |
| WO | 2016178676 A1 | 11/2016 |
| WO | 2018024654 A1 | 2/2018 |
| WO | 2018031540 A1 | 2/2018 |
| WO | 2018217198 A1 | 11/2018 |
| WO | 2018218033 A2 | 11/2018 |
| WO | 2019069992 A1 | 4/2019 |

OTHER PUBLICATIONS

Standard Test Method for Foaming Properties of Surface-Active Agents1, Designation: D 1173-53, Reapproved 2001, 2 pages.
'Defoamer, Retrieved from https://en.wikipedia.org/wiki/Defoamer' on May 30, 2019, 5 pages.
Abdulkadir et al., "Production and Refining of Corn Oil from Hominy Feed a By-Product of Dehulling Operation", ARPN Journal of Engineering and Applied Sciences, vol. 6, No. 4, Apr. 2011, 7 pages.
Corn Oil, Retrieved from 'https://corn.org/resources/?fwp_resource_type=pdf&fwp_search=Corn%200il', 2006, 24 pages.
Friedrich et al., "Properties and Processing of Corn Oils Obtained by Extraction With Supercritical Carbon Dioxide", JAOCS, vol. 61, No. 12, 1984, (3 pages).
Saini et al., "Carotenoid extraction methods: A review of recent developments", Food Chemistry, No. 240, pp. 90-103, 2018, (14 pages).
Leon Skaliotis, "Short Path to Premium Quality Oils", food Marketing & Technology, Feb. 2011, pp. 23-26, (4 pages).
Japir et al., "Separation of Free Fatty Acids from High Free Fatty Acid Crude Palm Oil Using Short-Path Distillation", he 2016 UKM FST Postgraduate Colloquium, AIP Conf. Proc. 1784, 030001-1-030001-8, 2016, (9 pages).
Back-End Value Enhanced through Patented Technology and Strategic Partnerships retrieved from WWW.Vali<http://WWW.Vali/>cor. ::om, (5 pages).
LCI Corporation, "Short Path Evaporation", retrieved from https://lcicorp.com/short_path_evaporators/short_path_evaporator, (2 pages).
Haumann, "Fat Modification—Interestrification Hydrogenation". Inform, vol. 5, No. 6 (Year: 1994).
Bailey, Helen K., "Novel Uses of Vegetable Oil in Asphalt Mixtures", Ph.D Thesis, U. of East London, UK, (Sep. 2010), 366 pgs.
Bailey, Helen K., et al., "The Use of Vegetable Oil as a Rejuvenator for Asphalt Mixtures", 5th Eurasphalt and Eurobitume Congress, Istanbul, (Jun. 13-15, 2012), 10 pgs.
Bennert, Thomas, "Fatigue Performance of Re-Refined Engine Oil Bottoms (REOB) Modified Asphalt—A Laboratory Study", 95th Annual Transportation Research Board Meeting, (Jan. 2016), 26 pgs.
Golalipour, Amir, "Investigation of the Effect of Oil Modification on Critical Characteristics of Asphalt Binders", PhD Dissertation, U. of Wisconsin—Madison, [Online]. Retrieved from the Internet: <URL: http://www.asphaltinstitute.org/wp-content/uploads/Thickness_Mix/PhDDissertationDocument-Final-AG2.pdf>, (2013), 204 pgs.
Hughes, Stephen R, "Production of Candida antarctica lipase B gene open reading frame using automated PCR gene assembly protocol on robotic workcell and expression in an ethanologenic yeast for use as resin-bound biocatalyst in biodiesel production", Journal of the Association for Lab. Automation, 16(1), Feb. 2011), 17-37.
Mogawer, Walaa S., "Evaluating the effect of rejuvenators on the degree of blending and performance of high RAP, RAS, and RAP RAS mixtures", Road Materials and Pavement Design, vol. 14, No. 2, (2013), 29 pgs.
Moghaddam, Taher Baghaee, et al., "The use of rejuvenating agents in production of recycled hot mix asphalt: A systematic review", Construction and Building Materials 114, (2016), 805-816.
Moreau, Robert A., "Changes in Lipid Composition During Dry Grind Ethanol Processing of Corn", Journal of the American Oil Chemist's Society, vol. 88, {Mar. 2010).
Saini, Ramesh Kumar et al., "Carotenoid extraction methods: A review of recent developments", Food Chemistry, No. 240, pp. 90-103, 2018, (14 pages).
Seidel, Joseph C., "Rheological characterization of asphalt binders modified with soybean fatty acids", Construction and Building Materials, vol. 53, {Feb. 2014), 324-332.
Van Den Berg, Corjan, "Simultaneous clostridial fermentation, lipase-catalyzed esterification, and ester extraction o enrich diesel with butyl butyrate", Biotechnology and Bioengineering, vol. 110, No. 1, Jan. 2013), 6 pgs.
W. R. Gibbons et al: "Integrated biorefineries with engineered microbes and high-value co-products for profitable biofuels production", In Vitro Cellular & Development Biology. Plant, vol. 45, No. 3, Apr. 3, 2009 (Apr. 3, 2009), pp. 218-228, XP055270849, US ISSN: 1054-5476, DOI: 10.1007/s11627-009-9202-1, 1O pages.
Winkler, Jill K., "Phytosterol and Tocopherol Components in Extracts of Corn Distiller's Dried Grain", J_ Agric. Food Chem., 55(16), {Jul. 2007), 6482-6486.
Winkler-Moser, Jill K., "Antioxidant Activity of Phytochemicals from Distillers Dried Grain Oil", Journal of the American Oil Chemist's Society, vol. 86, {Mar. 2009), 1073-1082.
Winkler-Moser, Jill K., et al., "Composition and oxidative stability of crude oil extracts of corn germ and distillers grains", Industrial Crops and Products 33, (2011), 572-578.
Yusoff et al. "Comparison of Fatty Acid Methyl and Ethyl Esters as Biodiesel Base Stock: a Review on Processing and Production Requirements", J Am Oil Chem Soc (2014) 91: 525-531; DOI: 10.1007/s11746-014-2443-0 (Year: 2014).
Zaumanis, Martins, "Influence of six rejuvenators on the performance properties of Reclaimed Asphalt Pavement RAP) binder and 100% recycled asphalt mixtures", Construction and Building Materials, vol. 71, {Nov. 2014), 14 pgs.
Zaumanis, Martins, et al., "Use of Rejuvenators for Production of Sustainable High Content RAP Hot Mix Asphalt", The XXVIII International Baltic Road Conference, (2013), 10 pgs.
"Micro-fine silica treated with an organic silicone compound", Dumacil® 300 FGK, Elementis Specialties, Apr. 2017, 1 page.

METHODS OF REFINING A GRAIN OIL COMPOSITION

RELATED APPLICATIONS

This present application is a continuation of U.S. Ser. No. 18/056,484 filed on Nov. 17, 2022, which is a continuation of U.S. Ser. No. 17/026,771, filed Sep. 21, 2020; which is a continuation application of U.S. Ser. No. 16/437,960 filed on Jun. 11, 2019, which claims the benefit of commonly owned provisional Applications: Ser. No. 62/683,347, filed Jun. 11, 2018; Ser. No. 62/814,006, filed on Mar. 5, 2019; and Ser. No. 62/817,789, filed on Mar. 13, 2019; wherein the entirety of each of said Applications is incorporated herein by reference.

BACKGROUND

Ethanol biorefineries typically produce fuel-grade ethanol using a fermentation-based process. Much of the ethanol used for transportation fuel in the United States is produced from the fermentation of corn. In an exemplary dry-grind ethanol production process, a vegetable such as corn is delivered to a biorefinery and its particle size can be reduced by grinding the corn in a dry milling step. The resulting corn flour can then be combined with water, nutrients, enzymes, yeast, and/or other ingredients in a fermenter. Enzymes convert starch into fermentable sugars. Yeast converts fermentable sugars into ethanol. Fermentation results in a beer stream that includes, e.g., ethanol, water, suspended solids, dissolved solids, and corn oil. The beer stream is processed by a distillation unit where ethanol is removed. The stream from the distillation unit after ethanol has been recovered is referred to as whole stillage. This whole stillage stream includes, e.g., suspended solids, dissolved solids, water, and corn oil. The whole stillage stream is separated, typically by decanting centrifuges, into a thin stillage stream and a wet cake stream. The wet cake stream has a higher concentration of solids than whole stillage and is typically of a relatively high viscosity sludge-like consistency. The thin stillage has a lower concentration of suspended solids than whole stillage and is typically of a relatively low viscosity liquid stream. The solids concentration of the thin stillage stream can be increased in an evaporation step where water is evaporated from the thin stillage. Concentrated thin stillage is referred to as syrup in the art. The syrup stream contains an increased concentration of corn oil, which can be separated and sold as distiller's corn oil (DCO). Alternatively, corn oil can be separated prior to fermentation, from the beer, from whole stillage, from thin stillage, from wet cake or any other corn oil containing process stream.

Biorefineries may separate DCO from process streams using centrifuges to produce a corn oil product. For example, U.S. Pat. No. 9,061,987 (Bootsma), U.S. Pat. No. 8,702,819 (Bootsma), and U.S. Pat. No. 9,695,449 (Bootsma), describe the separation of DCO using centrifuges, wherein the entireties of said patents are incorporated herein by reference. U.S. Pat. No. 8,008,516 (Cantrell et al.) describes DCO separation from thin stillage, wherein the entirety of said patent is incorporated herein by reference. U.S. Pat. No. 9,896,643 (Redford) reports methods and systems for recovering a desired co-product from a feedstock to ethanol production process, wherein the entirety of said patent is incorporated herein by reference.

While DCO is a valuable co-product, it is typically sold at commodity prices and used as a feedstock for biodiesel production or as an animal feed ingredient. There is a continuing need for refining grain oils such as corn oil and using grain oils for a variety of purposes.

SUMMARY

The present disclosure includes embodiments of a method of refining a grain oil composition feedstock to provide a grain oil product. The method includes combining the grain oil composition feedstock with water to form an oil-water mixture having water in an amount of 5-50% based on the total volume of the oil-water mixture (v/v). The grain oil composition includes an impurity component. The method also includes exposing the oil-water mixture to a temperature in the range from 0° C. to 50° C. for a time period at least until the oil-water mixture forms at least an oil phase and an emulsion phase. The method also includes recovering at least a portion of the oil phase from the emulsion phase to form the grain oil product. An amount of the impurity component in the emulsion phase is greater than an amount of the impurity component in the grain oil product.

The present disclosure also includes embodiments of a system for refining a grain oil composition feedstock. The system includes a source of a grain oil composition feedstock and a source of water. The grain oil composition includes an impurity component. The system also includes a first system in fluid communication with the source of the grain oil composition and the source of the water. The first system is configured to combine and mix the grain oil composition and the water to form an oil-water mixture having water in an amount of 5-50% based on the total volume of the oil water mixture (v/v); and expose the oil-water mixture to a temperature in the range from 0° C. to 50° C. for a time period at least until the oil-water mixture forms at least an oil phase and an emulsion phase. The system also includes a separation system configured to recover at least a portion of the oil phase from the emulsion phase to form the grain oil product.

The present disclosure also includes embodiments of an anti-foam composition that includes a carrier oil component and at least one anti-foaming ingredient. The carrier oil component includes a grain oil derived from a fermentation product. The grain oil is chosen from a grain oil composition, a byproduct of a grain oil composition, and mixtures thereof.

The present disclosure also includes embodiments of a method of controlling foam in a foamable composition. The method includes mixing a grain oil with the foamable composition to prevent, mitigate, or reduce foaming of the foamable composition. The grain oil is derived from a fermentation product. The grain oil is chosen from a grain oil composition, a byproduct of a grain oil composition, and mixtures thereof.

The present disclosure also includes embodiments of a method of reducing the amount of mineral oil carrier in a composition and includes replacing at least a portion of the mineral oil carrier in the composition with an amount of a grain oil composition derived from a fermentation product.

DETAILED DESCRIPTION

Figure 1:
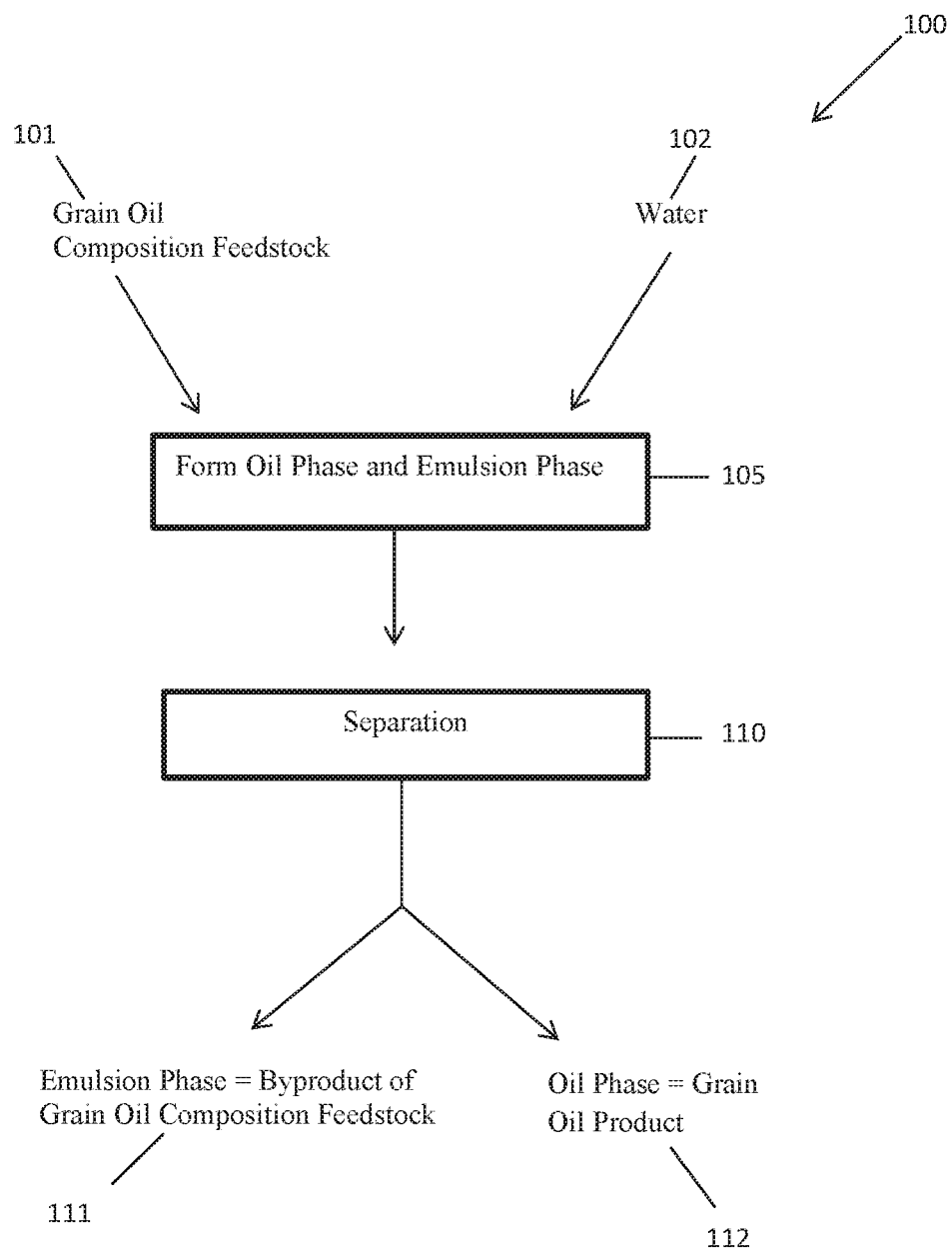
FIG. 1 is a schematic block diagram illustrating an embodiment of refining a grain oil composition feedstock according to the present disclosure.

The present disclosure involves grain oil compositions and byproducts thereof. As used herein, a "grain oil composition" refers to one or more compositions that can be used as a feedstock for the water refining process according to the present disclosure and one or more product compositions that have been refined according to the present disclosure. For example, a grain oil composition includes a grain oil composition feedstock such as distller's corn oil that is refined according to the present disclosure and a grain oil product produced thereby. In some embodiments, a grain oil composition can include a triglyceride component in an amount of at least 70 percent by weight of the grain oil composition, at least 80 percent by weight of the total grain oil composition, at least 90 percent by weight of the total grain oil composition, or even at least 90 percent by weight of the total grain oil composition. A grain oil composition can also include a diglyceride component and/or monoglyceride component. In some embodiments, a grain oil composition can be derived from a fermentation product that has been produced via fermentation of a grain material. In some embodiments, a grain oil composition can include oil derived from oleaginous microorganisms.

As used herein, a "byproduct of a grain oil composition" refers to fractions or phases that are separated from a grain oil composition feedstock to form a grain oil product. As described herein below, nonlimiting examples of a byproduct of a grain oil composition include an emulsion phase and/or a dehydrated emulsion phase product and/or an aqueous phase. While one or more of these byproducts may include high levels of one or more triglycerides, diglycerides, and monoglycerides, they are byproducts of the refining process described herein. In some embodiments a byproduct of a grain oil composition can have a triglyceride component present in an amount from 0 to 70 percent by weight of the total byproduct of a grain oil composition, or even from 5 to 50 percent by weight of the total byproduct of a grain oil composition.

As mentioned, the present disclosure includes embodiments of methods and systems for refining a grain oil composition feedstock to form a grain oil product. A method of refining a grain oil composition feedstock to provide a grain oil product includes providing a source of a grain oil composition feedstock.

A variety of grains (some of which may also be referred to as vegetables) can be used to provide a grain oil composition (and by-products thereof) such as one or more of corn, sorghum, wheat, rice, barley, soybean, rapeseed, oats, millet, rye and the like.

The grain oil composition feedstock includes at least a triglyceride component having one or more triglycerides. In some embodiments, the triglyceride component can be present in an amount of at least 70 percent by weight of the total grain oil composition feedstock, at least 80 percent by weight of the total grain oil composition feedstock, at least 90 percent by weight of the total grain oil composition feedstock, or even at least 95 percent by weight of the total grain oil composition feedstock. In some embodiments, the triglyceride component can be present in an amount from 70 to 99 percent by weight of the total grain oil composition feedstock, from 70 to 99 percent by weight of the total grain oil composition feedstock, from 80 to 95 percent by weight of the total grain oil composition feedstock, or even from 85 to 95 percent by weight of the total grain oil composition feedstock. Triglycerides can be determined by test method AOCS Cd 11d-96.

In some embodiments, the grain oil composition feedstock includes a diglyceride component having one or more diglycerides. In some embodiments, the diglyceride component can be present in an amount of 30 percent or less by weight of the total grain oil composition feedstock, 20 percent or less by weight of the total grain oil composition feedstock, 10 percent or less by weight of the total grain oil composition feedstock, or even 5 percent or less by weight of the total grain oil composition feedstock. In some embodiments, the diglyceride component can be present in an amount from 1 to 20 percent by weight of the total grain oil composition feedstock, from 1 to 15 percent by weight of the total grain oil composition feedstock, from 1 to 10 percent by weight of the total grain oil composition feedstock, or even from 1 to 5 percent by weight of the total grain oil composition feedstock. Diglycerides can be determined by test method AOCS Cd 11d-96.

In some embodiments, the grain oil composition feedstock includes a monoglyceride component having one or more monoglycerides. In some embodiments, the monoglyceride component can be present in an amount of 20 percent or less by weight of the total grain oil composition feedstock, 15 percent or less by weight of the total grain oil composition feedstock, 10 percent or less by weight of the total grain oil composition feedstock, or even 5 percent or less by weight of the total grain oil composition feedstock. In some embodiments, the monoglyceride component can be present in an amount from 1 to 15 percent by weight of the total grain oil composition feedstock, from 1 to 10 percent by weight of the total grain oil composition feedstock, from 1 to 5 percent by weight of the total grain oil composition feedstock, or even from 0.1 to 5 percent by weight of the total grain oil composition feedstock. Monoglycerides can be determined by test method AOCS Cd 11d-96.

In some embodiments, the grain oil composition feedstock includes a moisture content of 30 percent or less by weight of the total grain oil composition feedstock, 20 percent or less by weight of the total grain oil composition feedstock, 10 percent or less by weight of the total grain oil composition feedstock, 5 percent or less by weight of the total grain oil composition feedstock, or even 1 percent or less by weight of the total grain oil composition feedstock. In some embodiments, the moisture content can be from 0.01 to 10 percent by weight of the total grain oil composition feedstock, from 0.01 to 5 percent by weight of the total grain oil composition feedstock, from 0.01 to 1 percent by weight of the total grain oil composition feedstock, or even from 0.1 to 1 percent by weight of the total grain oil composition feedstock. Moisture content can be determined by a Karl Fischer titration (e.g., following ASTM E1064-12 or AOCS 2e-84).

The grain oil composition feedstock also includes an impurity component. As discussed below, the present disclosure includes methods and systems for removing at least a portion of the impurity component from the grain oil composition feedstock to produce a grain oil product having relatively higher purity, which can be more valuable. Depending on the intended use for the oil composition, one or more impurities can have an impact on one or more of oil color, catalyst fouling/inhibition (e.g., while forming biodiesel or renewable diesel from a grain oil composition feedstock), taste, smell, appearance, storage, and compatibility with further processing, materials and conditions to an undue degree. Accordingly, it may be desirable to remove one or more of these components. Nonlimiting examples of impurities include phospholipids, metals, free fatty acids, esters, soaps, gums, waxes, phosphatides, sterols, odiferous volatiles, colorants, and combinations thereof.

In some embodiments, grain oil composition feedstock includes an impurity component that includes at least an element component having one or more elements chosen from aluminum, arsenic, cadmium, calcium, chlorides, chromium, copper, iron, lead, magnesium, manganese, mercury, nitrogen, nickel, phosphorus, potassium, silicon, sodium, sulfur, vanadium, zinc, and combinations thereof. In some embodiments, the impurity component includes at least one element chosen from calcium, phosphorus, potassium, sodium, and combinations thereof. Metals can be determined by test method AOCS Ca 17-01. Phosphorus can be determined by test method AOCS Ca 20-99. Sulfur can be determined by test method ASTM D4951.

In some embodiments, the grain oil composition feedstock includes the element component in an amount of 100 parts per million (ppm) or more based on the total grain oil composition feedstock, 200 ppm or more based on the total grain oil composition feedstock, 500 ppm or more based on the total grain oil composition feedstock, 1000 ppm or more based on the total grain oil composition feedstock, or even 5000 ppm or more based on the total grain oil composition feedstock. In some embodiments, the element component can be from 5 to 10,000 ppm based on the total grain oil composition feedstock, from 100 to 5000 ppm based on the total grain oil composition feedstock, or even from 500 to 1000 ppm based on the total grain oil composition feedstock.

In some embodiments, at least a portion (e.g., including substantially all) of the element component is present as soap, which is a salt of the element and a fatty acid such as sodium oleate, magnesium stearate, combinations of these, and the like. In some embodiments, grain oil composition feedstock includes a soap component in an amount from 50 to 30,000 ppm, from 100 to 20,000 ppm, or even from 500 to 10,000 ppm. Soap content can be determined by test method AOCS Cc17-95.

In some embodiments, the grain oil composition feedstock contains no detectable phospholipid. For example, any phospholipid that may have been inherently present in the raw grain material may have been removed in an upstream process.

A grain oil composition feedstock can also include a fatty acid alkyl ester (FAAE) component including one or more fatty acid alkyl esters such as fatty acid ethyl ester (FAEE), which is an esterified (not free) fatty acid. Nonlimiting examples of fatty acid ethyl esters include one or more of ethyl linoleate, ethyl linolenate, ethyl oleate, ethyl palmitate, and ethyl stearate. In some embodiments, the amount of the one or more fatty acid alkyl esters is in the range from 0 to 30 percent by weight based on the total weight of the grain oil composition feedstock, from 0.5 to 20 percent by weight based on the total weight of the grain oil composition feedstock, or from 1 to 15 percent by weight based on the total weight of the grain oil composition feedstock.

A grain oil composition feedstock can also include a free fatty acid component including one or more free fatty acids. In some embodiments, the amount of the one or more free fatty acids is in the range from 0 to 30 percent by weight based on the total weight of the grain oil composition feedstock, from 0.5 to 20 percent by weight based on the total weight of the grain oil composition feedstock, or from 1 to 15 percent by weight based on the total weight of the grain oil composition feedstock. Free fatty acid can be determined by test method AOCS Ca 5a-40.

In some embodiments, a grain oil composition feedstock is derived from a fermentation product, or beer. Fermentation products can be produced by hydrolyzing materials containing sugar polymers and oil to produce a fermentable material containing fermentable sugars and oil and converting the sugars into a fermentation product using an organism capable of fermentation. For example, a grain containing starch and oil may be ground and the starch hydrolyzed into fermentable sugars, e.g., by using one or more enzymes, chemicals, heat, and/or other catalyst. The fermentable sugars may be converted into a target chemical, e.g. an alcohol such as ethanol using an organism, e.g. an ethanologen. The fermentation product can include the target chemical e.g. ethanol, water, oil, additional soluble components, unfermented particulate matter, and the like. The fermentation product can then be distilled to recover the target chemical, e.g. ethanol, leaving the remaining components as whole stillage.

A fermentation product containing oil can be derived from one or more grain materials. A variety of grain materials (some of which may also be referred to as vegetable materials) can be used such as whole ground grain or a fraction of a grain. Grain material can be derived from grain such as corn, sorghum, wheat, rice, barley, soybean, rapeseed, oats, millet, rye or any other grains that that are capable of being fermented and subjected to the refined oil process described herein.

In some embodiments, oil in the fermentation product can also be derived from oleaginous microorganisms. Exemplary oleaginous microorganisms include oleaginous microalgae, which can include the genus *Chlorella* or *Prototheca*, including, *Chlorella protothecoides* or *Prototheca moriformis, Nannochloropsis salina, Chlorella vulgaris, Scenedesmus dimorphus*, and *Chaetoceros gracilis*. Other exemplary oleaginous microorganisms include yeast such as

*Yarrowia lipolytica, Cryptococcus curvatus, Rhodosporidium toruloides*, and bacteria such as *Rhodococcus opacus*.

For illustration purposes, a process for obtaining a corn oil composition feedstock from corn grain is described herein. The process includes preparing the corn, saccharifying sugar polymers to obtain fermentable sugars, fermenting the sugars, recovering a corn oil composition feedstock, and refining the corn oil composition feedstock to form a corn oil product. A nonlimiting example of providing a corn grain oil composition feedstock for refining according to the present disclosure is illustrated in FIGS. 1 and 2.

Preparation of Grain for Saccharification

Figure 2:
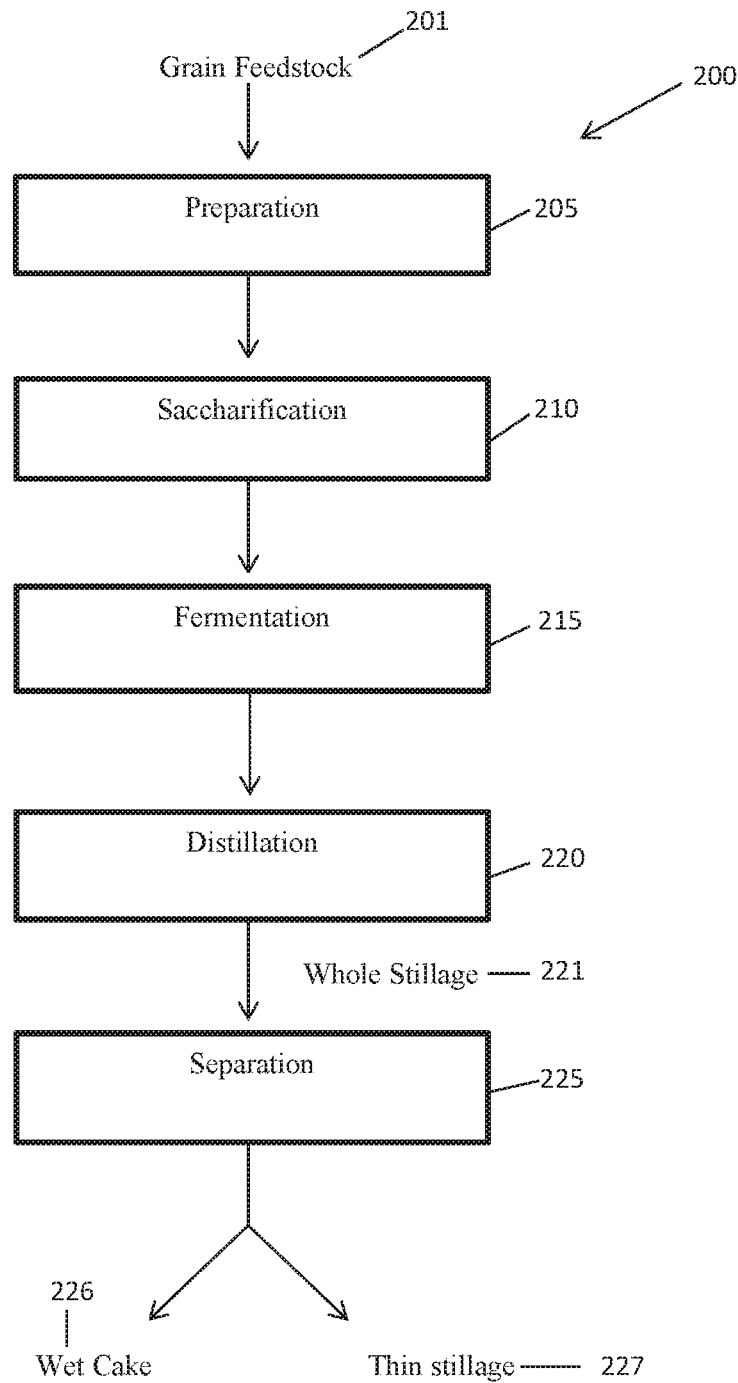
FIG. 2 is a schematic block diagram of an embodiment of processing grain feedstock to form thin stillage and wet cake.

As shown in FIG. 2, process 200 includes providing grain feedstock 201, e.g. corn, that is first be prepared 205 for saccharification 210 by reducing the size of the grain. In some embodiments, corn grain can be dry milled (e.g., hammer milled) to produce whole ground corn having a medium-to-fine grind for use in saccharification. In some embodiments, corn grain can be dry-fractionated to separate components of the corn grain (e.g., germ) from each other and then recombine two or more components (e.g., the endosperm and germ) for saccharification.

In some embodiments, the corn grain can be ground so that a substantial portion, e.g., a majority, of the ground corn grain fits through a sieve with a 0.1-5.0 mm screen, or even a 0.1-0.5 mm screen. For example, in an embodiment, about 70% or more, of the ground corn can fit through a sieve with a 0.1-0.5 mm screen.

Ground corn can be mixed with an appropriate amount of water to form an aqueous composition (e.g., a slurry) for subsequent saccharification of the slurry and fermentation of the resulting sugars. In an embodiment, whole ground corn can be mixed with liquid at about 20 to about 50 wt-% or about 25 to about 45 wt-% dry whole ground corn. The whole ground corn can include starch, fiber, protein, oil, endogenous enzymes, amino acids, etc. Any corn grain components (e.g., residual fiber, starch, sugar, oil, etc.) remaining after fermentation can be extracted/separated after fermentation and/or distillation, as discussed below. Because starch constitutes the largest mass portion of the corn grain it can be more efficient to extract other components (e.g., oil, fiber, protein, etc.) after at least a portion of the starch has been removed (i.e., hydrolyzed into glucose which is consumed by, e.g., yeast).

Saccharification

After forming an aqueous slurry that includes the corn material from preparing corn as described above, the aqueous slurry can be subjected to saccharification 210 to break down (hydrolyze) at least a portion of the starch into glucose that can be used by yeast during fermentation.

Saccharification can be performed by a variety of techniques. For example, heat and/or one or more enzymes can be used to saccharify components of the prepared corn into oligomers and monomers.

In some embodiments, a relatively low temperature saccharification process involves enzymatically hydrolyzing at least a portion of the starch in the aqueous slurry at a temperature below starch gelatinization temperatures, so that saccharification occurs directly from the raw native insoluble starch to soluble glucose while bypassing conventional starch gelatinization conditions. Starch gelatinization temperatures are typically in a range of 57° C. to 93° C. depending on the starch source and polymer type. Converting raw starch to glucose with one or more exogenous enzymes, e.g., glucoamylase and acid fungal amylase is described in U.S. Pat. No. 7,842,484 (Lewis) and U.S. Pat. No. 7,919,291 (Lewis et al.), wherein the entireties of the patents are incorporated herein by reference. In one embodiment, saccharification includes enzymatically (e.g., with alpha-amylases and gluco-amylases) hydrolyzing at least a portion of the starch in the aqueous slurry at a temperature below 40° C. or less to produce a slurry that includes glucose. In some embodiments, enzymatic hydrolysis occurs at a temperature in the range of from 25° C. to 35° C. to produce a slurry that includes glucose.

In some embodiments, saccharification of starch can include heating the slurry to a temperature in the range from 50° C. to 100° C.; from 60° C. to 90° C.; or even from 80° C. and 85° C. and adding a thermostable alpha-amylase to the slurry to initiate liquefaction. In some embodiments, saccharification of the starch can include jet-cooking the slurry at a temperature between 100° C. to 145° C. to complete gelatinization of the slurry.

Fermentation

After saccharification, the resulting slurry ("grain mash composition") includes grain solids, grain oil and sugar. The sugar (glucose) that is generated from saccharification can be fermented 215 into one or more biochemicals (e.g., butanol, ethanol, and the like). Systems for producing more than one biochemical from the glucose can be integrated together or be separate. Fermenting can be carried out by microorganisms. Exemplary microorganisms include ethanologens, butanologens, and the like. Exemplary microorganisms include yeasts.

In some embodiments, fermenting can include contacting an aqueous slurry including sugars derived from ground corn with microorganisms under conditions suitable for growth of the microorganims and production of a biochemical. For examples, yeasts may be used that convert the sugars to ethanol. Suitable yeasts include any variety of commercially available yeasts, such as commercial strains of *Saccharomyces cerevisiae*.

Optionally, one or more components (e.g., yeast nutrients) can be included in the aqueous slurry that is to be fermented.

In some embodiments, saccharification and fermentation can occur simultaneously in the same reactor (also referred to as simultaneous saccharification and fermentation (SSF)).

In some embodiments, fermenting a grain mash can include fermenting the grain mash in the presence of one or more enzymes (endogenous enzymes and/or exogenous enzymes) to generate one or more fatty acid alkyl esters. Examples of such enzymes include lipase, esterase, and combinations thereof.

Distillation

After fermentation, the biochemical can be removed from the beer in a distillation system 220 to form a whole stillage 221. For example, a beer derived from corn can be distilled to remove ethanol and form whole stillage. For example, heat and/or vacuum may be applied to the fermentation product in a distillation unit to evaporate and condense the biochemical to separate it from the rest of the fermentation product. The bottoms stream from the distillation unit after the biochemical has been recovered is referred to as whole stillage 221. This whole stillage stream 221 includes, e.g., suspended solids, dissolved solids, water, and oil. The whole stillage stream is separated, typically by decanting centrifuges, into a thin stillage stream 227 and a wet cake stream 226.

The wet cake stream 226 is a wet, solid stream e.g. greater than 25% solids w/w. The thin stillage stream 227 is a liquid stream that contains a lower concentration of suspended solids, e.g. less than 15% solids w/w, compared to whole stillage.

Figure 3:
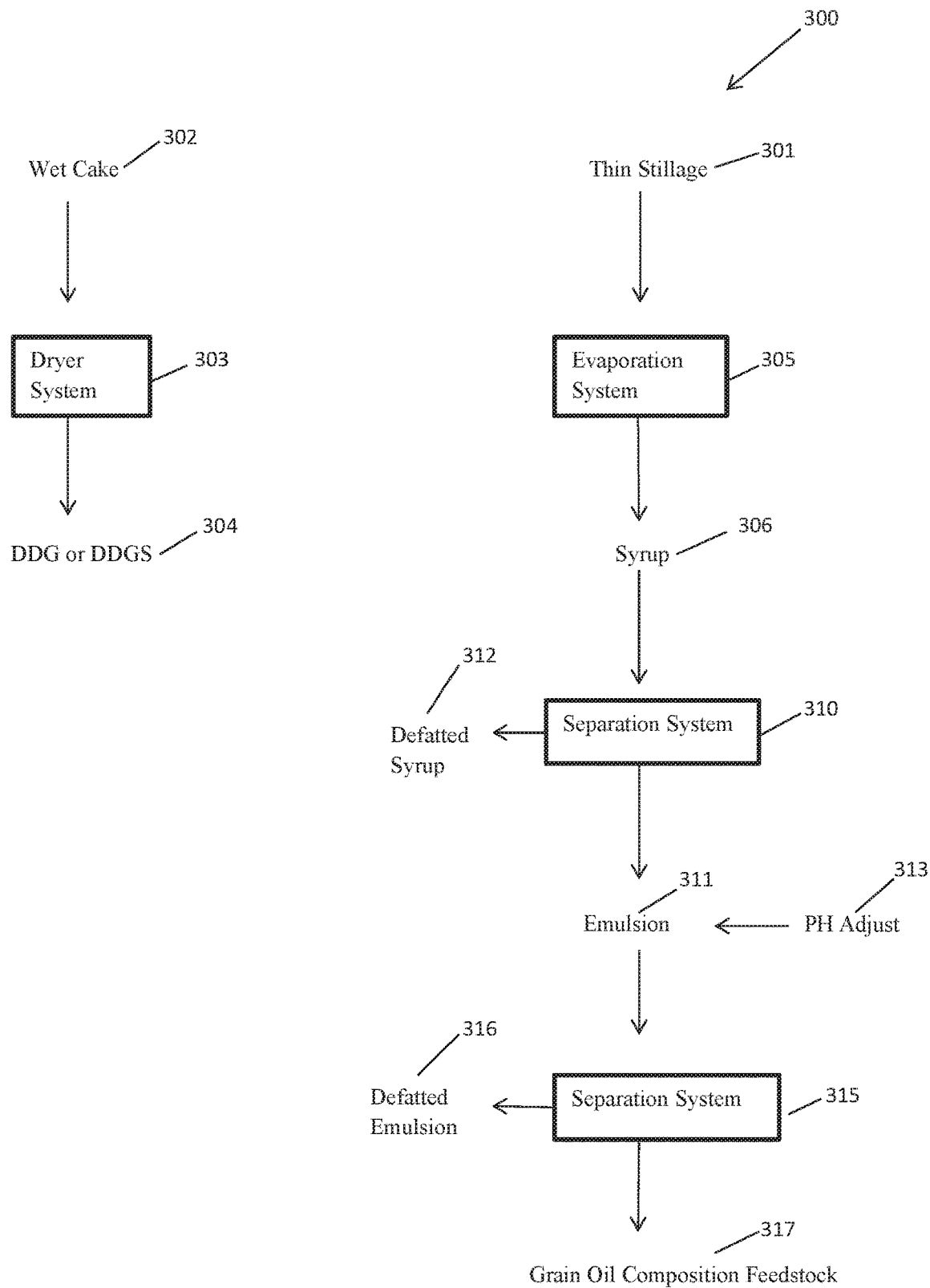
FIG. 3 is a schematic diagram of an embodiment of forming a grain oil composition feedstock from thin stillage.

Referring to the nonlimiting, exemplary process flow 300 in FIG. 3, the thin stillage stream 301 and wet cake stream 302 can be further processed as illustrated. The solids concentration of the thin stillage stream can be increased in an evaporation step 305 where water is evaporated from the thin stillage 301. Concentrated thin stillage is referred to as syrup 306 in the art. The syrup stream 306 contains an increased concentration of corn oil, which can be separated as an oil composition and sold as distiller's corn oil (DCO).

In some embodiments, an oil composition can be derived from a fermentation product before distillation. In some embodiments, an oil composition can be derived from a fermentation product after distillation. For example, in some embodiments an oil composition can be derived from a whole stillage composition obtained after distillation of a fermentation product.

The wet cake 302 can be dried in a dryer system 303 to provide "Distillers Dried Grains" (DDG) 304. In some embodiments, a portion of the syrup may be blended into DDG or added to the wet cake before drying to produce Distillers Dried Grain with Solubles (DDGS).

As used herein, "grain stillage composition" is used to refer to whole stillage, thin stillage, wet cake and/or syrup. A grain oil composition feedstock may be derived from the stillage composition.

Referring to FIG. 3, syrup 306 can be processed to provide a grain oil composition feedstock 317 that can be refined with water according to the present disclosure. As shown in FIG. 3, syrup can be separated via separation system 310 into a first oil fraction 311 and a first aqueous fraction 312 (defatted syrup). The first oil fraction 311 can be referred to as distiller's corn oil. In some embodiments, first oil fraction 311 is a grain oil composition feedstock that is refined that is refined with water according to the present disclosure. As shown, if first oil fraction 311 is an emulsion, it can have its pH adjusted (e.g., from 7-9) to break the emulsion into a second oil fraction 317 and a second aqueous fraction 316 (defatted emulsion). In some embodiments, as shown, the second oil fraction 317 is a grain oil composition feedstock that is refined that is refined with water according to the present disclosure. The second oil fraction can also be referred to as distiller's corn oil that is sold under the trade name Voila® corn oil.

Examples of methods of extracting oil from a stillage composition are described at U.S. Pat. No. 9,061,987, (Bootsma), U.S. Pat. No. 8,702,819 (Bootsma), and U.S. Pat. No. 9,695,449 (Bootsma) wherein oil is separated using centrifuges. The entireties of these patents are incorporated herein by reference. U.S. Pat. No. 8,008,516 (Cantrell et al.) describes DCO separation from thin stillage, wherein the entirety of the patent is incorporated herein by reference. U.S. Pat. No. 9,896,643 (Redford) describes recovering a light phase product from ethanol product, wherein the entirety of the patent is incorporated herein by reference.

Optionally, a grain oil composition feedstock can be treated before being refined according to the present disclosure. Nonlimiting examples of such treatments include one or more of degumming, adding a flocculating agent to the grain oil composition, adding a filter aid to the grain oil composition.

Combining the Grain Oil Composition Feedstock with Water

According to the present disclosure a grain oil composition feedstock is combined with water to form an oil-water mixture and form an oil phase (grain oil product) and an emulsion phase and so that at least a portion of the impurity component can transfer into the emulsion phase, thereby advantageously producing a relatively more pure grain oil product as compared to the grain oil composition feedstock.

The amount of water combined with the grain oil composition feedstock is selected so that the amount of water in the oil-water mixture is from 5-50% based on the total volume of the oil water mixture (v/v). Accordingly, the amount of water can vary, for example, based on the amount of water in the grain oil composition feedstock. In some embodiments, the amount of water in the oil-water mixture is from 10-40% based on the total volume of the oil water mixture (v/v), from 10-40% based on the total volume of the oil water mixture (v/v), from 5-10% based on the total volume of the oil water mixture (v/v), from 8-15% based on the total volume of the oil water mixture (v/v), from 10-25% based on the total volume of the oil water mixture (v/v), from 20-35% based on the total volume of the oil water mixture (v/v), from 25-50% based on the total volume of the oil water mixture (v/v), or even from 3-50% based on the total volume of the oil water mixture (v/v).

The amount of water added can affect how many layers, or phases, form from the oil-water mixture. In some embodiments, the oil-water mixture forms into at least an oil layer/phase and an emulsion layer/phase. In some embodiments, if a relatively large amount of water is combined with the grain oil composition feedstock, the oil-water mixture can form into three layers/phases. Namely, an oil layer, an emulsion layer and a water layer. In some embodiments, the oil-water mixture forms into a top layer, or light, oil phase and a bottom layer, or heavy, emulsion phase.

Water can be obtained from a variety of sources. Nonlimiting examples of water sources include standard tap water, biorefinery distillate, reverse osmosis (RO) reject, RO permeate, de-ionized water, or any other suitable water source. While not being bound by theory, it is believed that with respect to at least some impurities adding water can provide a concentration gradient to facilitate transferring one or more impurities into an emulsion phase so that they can be sequestered from the oil phase. Not wishing to be bound by theory, it is believed that the addition of water may also hydrate one or more impurities that are sequestered in an emulsion phase that may be separated from the oil phase that becomes the grain oil product. The term sequestering as used herein refers to the process wherein contaminants are either directly or indirectly (through binding to water molecules) taken up into the emulsion phase.

Optionally, one or more chelating agents can be added to the water to aid in removal of metals and metal compounds from the grain oil composition feedstock. In some embodiments, the metals are calcium, potassium, magnesium, aluminum, iron, and copper. Metal contaminants, especially iron, can darken oil during other processing steps (e.g. deodorizing of oil), and even small amounts of iron that do not affect the oil's color can reduce stability of refined oil. Exemplary chelating agents include ethylenediaminetetraacetic acid (EDTA). Commercially available EDTA is sold as VERSENE 100 (Dow Chemical). It is envisioned that any suitable chelating agent could be used.

FIG. 1 is a schematic block diagram illustrating an embodiment 100 of refining a grain oil composition feedstock according to the present disclosure. As shown, a source of grain oil composition feedstock 101 and a source of water 102 are combined in a system 105 to form an emulsion phase and an oil phase.

A wide variety of systems and apparatuses can be used to combine and mix the grain oil composition feedstock 101 and source of water 102. One or more mixing/agitation apparatuses can be combined in series and/or in parallel.

Nonlimiting examples include one or more static mixers (e.g., inline static mixers), impeller mixers, pumps, shear mixers, tank recirculation loops, tank mixers (e.g., continuously stirred tank reactors), and combinations thereof (e.g., in series), or other mixers able to disperse the water in the grain oil composition and promote thorough mixing. In some embodiments, a grain oil composition feedstock stream 101 and a water stream 102 can be piped to combine in a common pipe and mix together.

A wide variety of conditions can be used to form an emulsion phase and an oil phase. For example, the oil-water mixture is exposed to a temperature in the range from 0° C. to 50° C. for a time period at least until the oil-water mixture forms at least an oil phase and an emulsion phase. In some embodiments, the oil-water mixture is exposed to a temperature in the range from 5° C. to 35° C., 10° C. to 30° C., 15° C. to 25° C., or even from 20° C. to 30° C. In some embodiments, the oil-water mixture is at a temperature in the range from 0° C. to 5° C., or 0° C. to 10° C. In some embodiments, the oil and water are mixed in a refrigerated vessel that is at 2° C. to 7° C. or from 3° C. to 5° C. temperature for 30 minutes to 5 hours. In some embodiments, oil-water mixture is simply allowed to cool over time to e.g., 10° C. to 40° C.

In some embodiments, the two phases can be cooled (e.g., about 4° C.) in a container so that the heavy phase fraction forms a solid. The liquid light phase fraction can then be easily separated from the heavy phase fraction. Additionally, the corn oil in FIG. 1 may be treated prior to separation. Treatment methods may include degumming, adding a flocculating agent to the corn oil, adding a filter aid to the corn oil, or a combination of these methods. It is recognized that the separation process in FIG. 1 may be suitable for separating other vegetable oils. Also, an as-is distiller's corn oil can be combined with an amount of water prior to separating into a light phase fraction and heavy phase fraction. It was discovered that combining, e.g., 20% w/w of water with as-is distiller's corn oil prior to separation resulting in a heavy phase fraction that was a bright yellow, homogenous emulsion.

Figure 4:
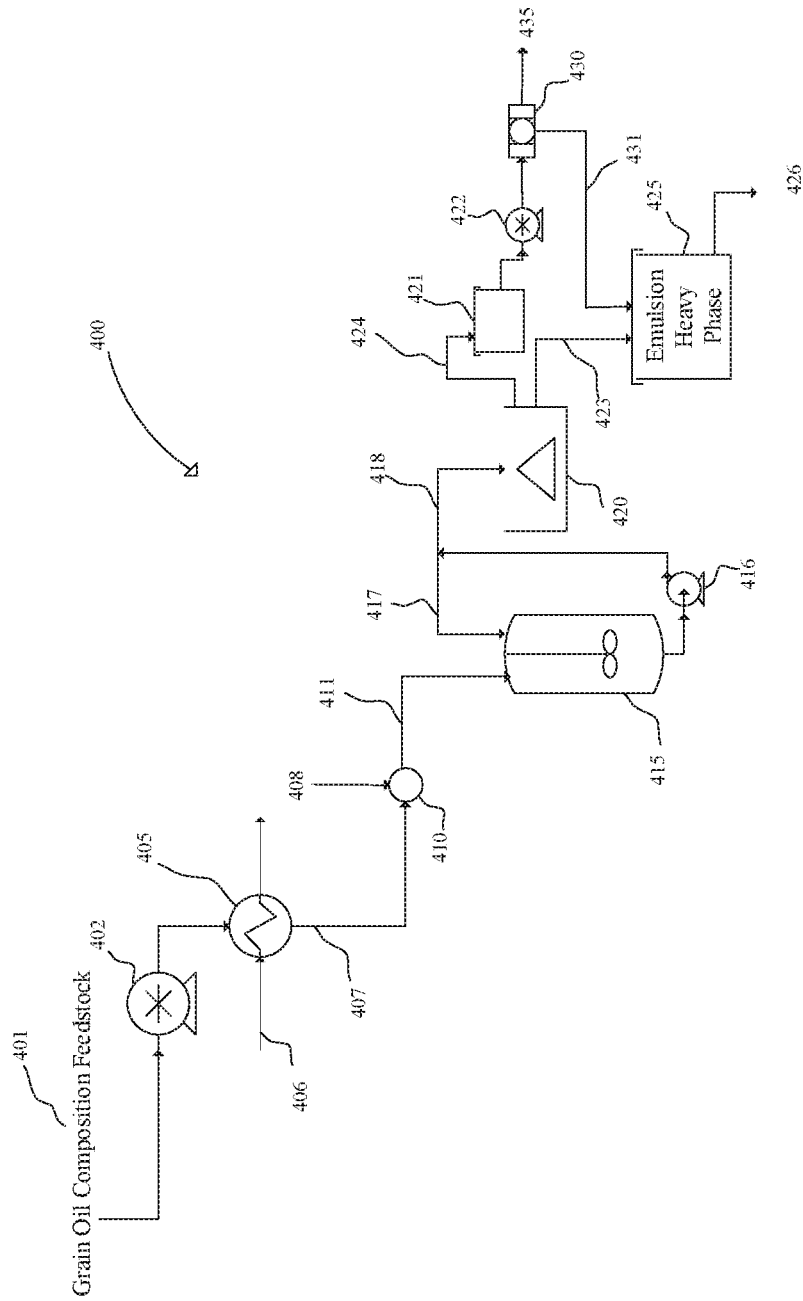
FIG. 4 is a schematic process flow diagram illustrating an embodiment of refining a grain oil composition feedstock according to the present disclosure.

FIG. 4 is a schematic process flow diagram illustrating a more detailed embodiment of refining a grain oil composition feedstock according to the present disclosure. As shown in FIG. 4, the grain oil composition feedstock 401 can be relatively hot or cool before it is combined with water to form an emulsion according to the present disclosure. For example the grain oil composition feedstock 401 can be at a temperature greater than 50° C. (e.g., from 70° C. to 105° C., or even from 70° C. to 95° C.) or less than 0° C. And, for example, if the grain oil composition feedstock is at a temperature above 50° C. (e.g., 90° C.) it may be challenging to the form an emulsion phase. Accordingly, the grain oil composition feedstock 401 can be cooled or heated so that it is at a temperature in the range from 0° C. to 50° C. A variety of heating or cooling techniques can be used. For example, the temperature of the grain oil composition feedstock 401 can be adjusted (heated or cooled) by using a heat exchanger and/or by mixing the grain oil composition feedstock 401 with an appropriate amount of water at an appropriate temperature. As shown in FIG. 4, the grain oil composition feedstock 401 is pumped via pump 402 through a heat exchanger 405 that utilizes a heat transfer medium 406 (e.g., water) to adjust the temperature of the grain oil composition feedstock 401. Heat exchanger 405 may be a plate and frame heat exchanger, a shell and tube heat exchanger, or some other heat exchanger that is suitable for cooling or heating a grain oil stream. The heat exchange fluid 406 that is used to transfer heat may be process water at a biorefinery. If colder temperatures are desired, the heat exchange fluid may be chilled glycol or a different heat exchange fluid. As shown, water 408 is combined with the temperature adjusted grain oil composition feedstock 407, e.g., via mixing device 410. The temperature of the grain oil composition feedstock 401 (if heat exchanger 405 is omitted) or the temperature adjusted grain oil composition feedstock 407 may be adjusted (heated or cooled) by the temperature of the water 408 that is combined with it in the mixing device 410 (e.g., an inline static mixer) to form an oil-water mixture 411 at a temperature in the range from 0° C. to 50° C. In some embodiments, the temperature of the oil-water mixture 411 is from 0° C. to 50° C. by adding water 408 that is at a temperature of 10° C. to 40° C. In some embodiments the temperature adjusted grain oil composition feedstock 407 may be cooled (e.g. to less than 30° C.) before adding the water 408. In still other embodiments, the temperature of the oil-water mixture 411 once formed may be further adjusted (e.g., cooled). Although not shown, water stream 408 or an additional water stream could be combined with the grain oil composition feedstock 401 and/or the temperature adjusted grain oil composition feedstock 407 directly in mixing tank 415.

As shown, the oil-water mixture can be further agitated to facilitate forming an oil phase and an emulsion phase so that at least a portion of the impurity component is sequestered in the emulsion phase. As shown in the illustrative example of FIG. 4, the oil-water mixture 411 is fed into tank mixer 415, wherein it is mixed using mixing impellers and is recirculated via pump 416 and recirculation line 417.

Forming an oil phase and emulsion phase as described herein can be performed in a continuous or batch manner. In some embodiments, when the process is carried out as a batch process, the grain oil composition feedstock and water can be introduced sequentially or simultaneously and in any order. If the oil-water mixture is agitated and then allowed to settle it will form layers. In some embodiments when the process is carried out as a continuous process, inline static mixer 410 can instead be an intersection of piping where grain oil composition feedstock and water are introduced simultaneously and then subsequently mixed by a mixing device, such as a static mixer.

The oil-water mixture can be mixed for a time period to form the oil phase and emulsion phase and permit at least a portion of the impurity component to be sequestered in the emulsion phase. Mixing parameters are selected according to the mechanical design of the mixer. Mixing may be performed from a period of fractions of a second to hours, e.g., from 5 minutes to 5 hours. Mixing may occur in a continuous flow mixing vessel. If so, adjusting the volume of the continuous flow reactor will adjust the mean residence time of the oil-water mixture in the reactor, thereby controlling the length of the mixing period; e.g. for a given flow through rate, a larger reactor vessel will provide a longer mean residence period.

Recovering the Oil Phase from the Emulsion Phase

As shown in FIG. 1, after forming the emulsion phase and the oil phase, at least a portion of the oil phase can be separated and recovered 110 from the emulsion phase 111 to form a grain oil product 112. The emulsion phase 111 can also be referred to as a by-product of the grain oil composition feedstock 101. A wide variety of systems and devices can be used to separate at least a portion of the emulsion phase from the oil phase. Because the oil phase has a bulk density that is less than the bulk density of the emulsion phase, separation techniques based on density differences can be used. In some embodiments, separation is accomplished by allowing gravity phase separation to occur over time using a settling tank and/or a cooled settling tank, followed by decanting the oil phase layer. In some embodiments separation is accomplished more quickly by centrifugation. These and other methods may be combined. Centrifugation can be by, for example, a decanter centrifuge, a disk stack centrifuge, a cooled disk stack centrifuge, a screen centrifuge, hydrocyclone or a combination thereof. The speed or amount of centrifugal force applied can depend on various factors such as sample size and may be adjusted appropriately depending on such factors. For example, centrifugation may be carried out at 4,200 rpm. In some embodiments, centrifugation is carried out at 4,200 rpm, for 20 minutes and at 27° C. Nonlimiting examples of other apparatuses that can be used to separate an emulsion phase from an oil phase include a filter press, a rotary drum filter, or some other apparatus that is suitable to separate a liquid stream based on density differences.

Referring to the illustrative example of FIG. 4, the oil water mixture 418 is passed through a centrifuge 420 to separate emulsion (heavy phase) 423 from the oil phase (light phase) 424.

After isolating a grain oil product (light phase fraction) and an emulsion phase (heavy phase fraction), the grain oil product and/or the emulsion phase can be filtered to remove solid particles and/or waxy particles. Waxy particles refer to particles that may settle out at a given temperature (e.g., 21° C.). As shown in FIG. 4, the oil phase 424 can be transferred to a surge tank (collection tank) 421. The pressure of the light phase 424 leaving the centrifuge 420 may not be high enough to pass through downstream equipment. Surge tank 421 and pump 422 facilitate pumping light phase 424 downstream. Also, surge tank 421 and pump 422 can help provide a consistent flow rate, for example, when the flow of light phase 424 from centrifuge 420 experiences fluctuations. As shown, light phase 424 is pumped through one or more filter apparatuses 430 in series or parallel to remove at least a portion of solids, waxy particles, soaps, metals, and combinations thereof from the oil phase 424 and form a final grain oil product 435. Nonlimiting examples of filter apparatuses include a filter press, a cylindrical cartridge filter, a pleated cartridge filter, a sock filter, and combinations thereof. In some embodiments, a filter's nominal micrometer rating may be 1, 2, 3, 4, 5, 6, 7, 8, 9, or even 10 microns.

As shown, depending on the end use, any solids, waxy particles, soaps, metals, and combinations thereof that are separated from the oil phase 424 can be transferred via stream 431 and combined with the emulsion phase 423 in one or more tanks 425 and form an emulsion product 426.

According to the present disclosure, an amount of the impurity component in the emulsion phase is greater than an amount of the impurity component in the grain oil product. In some embodiments, at least 50 percent by weight of the impurity component in the grain oil feedstock composition is present in the emulsion phase, at least 60 percent by weight of the impurity component in the grain oil feedstock composition is present in the emulsion phase, at least 70 percent by weight of the impurity component in the grain oil feedstock composition is present in the emulsion phase, at least 80 percent by weight of the impurity component in the grain oil feedstock composition is present in the emulsion phase, at least 90 percent by weight of the impurity component in the grain oil feedstock composition is present in the emulsion phase, or even at least 95 percent by weight of the impurity component in the grain oil feedstock composition is present in the emulsion phase.

As mentioned, the oil phase can be a final grain oil product or can be further treated (see below) to become a final grain oil product. Because of the water refining process described herein, the grain oil product can be referred to as "refined" because it can have a relatively higher triglyceride content and relatively less impurity component than was present in the grain oil composition feedstock and/or that is present in the emulsion phase (and/or optional aqueous, third phase/layer). In some embodiments, the grain oil product passes visual inspection as being clear and bright after 48 hr. incubation at 0° C. In some embodiments, the oil yield achieved by the described refining process is at least 60 percent of the starting grain oil feedstock composition, at least 70 percent of the starting grain oil feedstock composition, at least 80 percent of the starting grain oil feedstock composition, or even at least 90 percent of the starting grain oil feedstock composition.

As mentioned, the grain oil product includes at least a triglyceride component having one or more triglycerides. The amount of the triglyceride component in the grain oil product can depend on, e.g., the amount present in the grain oil feedstock composition. In some embodiments, the triglyceride component can be present in an amount of at least 70 percent by weight of the total grain oil product, at least 80 percent by weight of the total grain oil product, at least 90 percent by weight of the total grain oil product or even at least 95 percent by weight of the total grain oil product. In some embodiments, the triglyceride component can be present in an amount from 70 to 99 percent by weight of the total grain oil product, from 75 to 95 percent by weight of the total grain oil product, from 80 to 95 percent by weight of the total grain oil product, or even from 85 to 95 percent by weight of the total grain oil product. Triglycerides can be determined by test method AOCS Cd 11d-96.

In some embodiments, the grain oil product includes a diglyceride component having one or more diglycerides. The amount of the diglyceride component in the grain oil product can depend on, e.g., the amount present in the grain oil feedstock composition. In some embodiments, the diglyceride component can be present in an amount of 30 percent or less by weight of the total grain oil product, 20 percent or less by weight of the total grain oil product, 10 percent or less by weight of the total grain oil product, or even 5 percent or less by weight of the total grain oil product. In some embodiments, the diglyceride component can be present in an amount from 1 to 20 percent by weight of the total grain oil product, from 1 to 15 percent by weight of the total grain oil product, from 1 to 10 percent by weight of the total grain oil product, or even from 1 to 5 percent by weight of the total grain oil product. Diglycerides can be determined by test method AOCS Cd 11d-96.

In some embodiments, the grain oil product includes a monoglyceride component having one or more monoglycerides. The amount of the monoglyceride component in the grain oil product can depend on, e.g., the amount present in the grain oil feedstock composition. In some embodiments, the monoglyceride component can be present in an amount of 20 percent or less by weight of the total grain oil product, 15 percent or less by weight of the total grain oil product, 10 percent or less by weight of the total grain oil product, or even 5 percent or less by weight of the total grain oil product. In some embodiments, the monoglyceride component can be present in an amount from 1 to 15 percent by weight of the total grain oil product, from 1 to 10 percent by weight of the total grain oil product, from 1 to 5 percent by weight of the total grain oil product, or even from 0.1 to 5 percent by weight of the total grain oil product. Monoglycerides can be determined by test method AOCS Cd 11d-96.

The moisture content in the grain oil product can depend on, e.g., the moisture content present in the grain oil feedstock composition. In some embodiments, the grain oil product includes a moisture content of 20 percent or less by weight of the total grain oil product, 10 percent or less by weight of the total grain oil product, 5 percent or less by weight of the total grain oil product, 1 percent or less by weight of the total grain oil product, or even 0.5 percent or less by weight of the total grain oil product. In some embodiments, the moisture content can be from 0.01 to 5 percent by weight of the total grain oil product, from 0.01 to 1 percent by weight of the total grain oil product, from 0.01 to 0.5 percent by weight of the total grain oil product, or even from 0.1 to 0.5 percent by weight of the total grain oil product. Moisture content can be determined by a Karl Fischer titration (e.g., following ASTM E1064-12 or AOCS 2e-84).

In some embodiments, the grain oil product may include some to the impurity component that was present in the grain oil composition feedstock. As discussed herein, in some embodiments it is desirable to perform the refining process described herein to sequester as much of the impurity component in the grain oil composition feedstock in the emulsion phase as possible. In some embodiments, the grain oil product includes an impurity component having one or more elements chosen from aluminum, arsenic, cadmium, calcium, chlorides, chromium, copper, iron, lead, magnesium, manganese, mercury, nitrogen, nickel, phosphorus, potassium, silicon, sodium, sulfur, vanadium, zinc, and combinations thereof. In some embodiments, the impurity component includes at least one element chosen from calcium, phosphorus, potassium, sodium, and combinations thereof. Metals can be determined by test method AOCS Ca 17-01. Phosphorus can be determined by test method AOCS Ca 20-99. Sulfur can be determined by test method ASTM D4951. In some embodiments, the grain oil product includes the element component in an amount of 500 parts per million (ppm) or less based on the total grain oil product, 200 ppm or less based on the total grain oil product, 100 ppm or less based on the total grain oil product, 50 ppm or less based on the total grain oil product, or even 25 ppm or less based on the total grain oil product. In some embodiments, the grain oil product includes the element component in an amount from about 0-100 ppm, from 0-50 ppm, 0-10 ppm, 5-20 ppm, 10-30 ppm, 25-50 ppm, 35-60 ppm, 45-75 ppm, 50-75 ppm, or even 75-100 ppm.

In some embodiments, at least a portion (e.g., including substantially all) of the element component is present as soap, which is a salt of the element and a fatty acid such as sodium oleate, magnesium stearate, combinations of these, and the like. In some embodiments, grain oil product includes a soap component in an amount from 0 to 500 ppm, from 0 to 100 ppm, or even from 0 to 50 ppm. Soap content can be determined by test method AOCS Cc17-95.

In some embodiments, the grain oil product contains no detectable phospholipid. For example, any phospholipid that may have been inherently present in the raw grain material may have been removed in an upstream process.

A grain oil product can also include a fatty acid alkyl ester (FAAE) component including one or more fatty acid alkyl esters such as fatty acid ethyl ester (FAEE), which is an esterified (not free) fatty acid. Nonlimiting examples of fatty acid ethyl esters include one or more of ethyl linoleate, ethyl linolenate, ethyl oleate, ethyl palmitate, and ethyl stearate. In some embodiments, the amount of the one or more fatty acid alkyl esters is in the range from 0 to 30 percent by weight based on the total weight of the grain oil product, from 0.5 to 20 percent by weight based on the total weight of the grain oil product, or from 1 to 15 percent by weight based on the total weight of the grain oil product.

A grain oil product can also include a free fatty acid component including one or more free fatty acids. In some embodiments, the amount of the one or more free fatty acids is in the range from 0 to 10 percent by weight based on the total weight of the grain oil product, from 0.5 to 5 percent by weight based on the total weight of the grain oil product, or from 0.5 to 2 percent by weight based on the total weight of the grain oil product. Free fatty acid can be determined by test method AOCS Ca 5a-40.

The emulsion phase can be a final emulsion product or can be further treated (see below) to become a final emulsion product. Because of the water refining process described herein, the emulsion phase can have relatively more impurity component than was present in the grain oil composition feedstock and/or that is present in the grain oil product.

The emulsion phase may include at least a triglyceride component having one or more triglycerides. The amount of the triglyceride component in the emulsion phase can depend on, e.g., the amount present in the grain oil feedstock composition and the yield in the grain oil product. In some embodiments, the triglyceride component can be present in an amount of 80 percent or less by weight of the total emulsion phase, 70 percent or less by weight of the total emulsion phase, 60 percent or less by weight of the total emulsion phase, or even 50 percent or less by weight of the total emulsion phase. In some embodiments, the triglyceride component can be present in an amount from 0 to 70 percent by weight of the total emulsion phase, from 5 to 50 percent by weight of the total emulsion phase, from 10 to 40 percent by weight of the total emulsion phase, or even from 15 to 30 percent by weight of the total emulsion phase. Triglycerides can be determined by test method AOCS Cd 11d-96.

In some embodiments, the emulsion phase includes a diglyceride component having one or more diglycerides. The amount of the diglyceride component in the emulsion phase can depend on, e.g., the amount present in the grain oil feedstock composition. In some embodiments, the diglyceride component can be present in an amount of 10 percent or less by weight of the total emulsion phase, 5 percent or less by weight of the total emulsion phase, or even 1 percent or less by weight of the total emulsion phase. Diglycerides can be determined by test method AOCS Cd 11d-96. In some embodiments, the emulsion phase includes a monoglyceride component having one or more monoglycerides. The amount of the monoglyceride component in the emulsion phase can depend on, e.g., the amount present in the grain oil feedstock composition. In some embodiments, the monoglyceride component can be present in an amount of 10 percent or less by weight of the total emulsion phase, or even 1 percent or less by weight of the total emulsion phase. Monoglycerides can be determined by test method AOCS Cd 11d-96. The moisture content in the emulsion phase can depend on, e.g., the moisture content present in the grain oil feedstock composition and water added to the grain oil composition feedstock. In some embodiments, the emulsion phase includes a moisture content of 20 percent or more by weight of the total emulsion phase, 30 percent or more by weight of the total emulsion phase, 40 percent or more by weight of the total emulsion phase, 50 percent or more by weight of the total emulsion phase, or even 60 percent or more by weight of the total emulsion phase. In some embodiments, the moisture content can be from 20 to 70 percent by weight of the total emulsion phase, from 30 to 65 percent by weight of the total emulsion phase, or even from 35 to 65 percent by weight of the total emulsion phase. Moisture content can be determined by a Karl Fischer titration (e.g., following ASTM E1064-12 or AOCS 2e-84).

As discussed herein, it can be desirable to perform the refining process described herein to sequester as much of the impurity component in the grain oil composition feedstock in the emulsion phase as possible. In some embodiments, the emulsion phase includes an impurity component having one or more elements chosen from aluminum, arsenic, cadmium, calcium, chlorides, chromium, copper, iron, lead, magnesium, manganese, mercury, nitrogen, nickel, phosphorus, potassium, silicon, sodium, sulfur, vanadium, zinc, and combinations thereof. In some embodiments, the impurity component includes at least one element chosen from calcium, phosphorus, potassium, sodium, and combinations thereof. Metals can be determined by test method AOCS Ca 17-01. Phosphorus can be determined by test method AOCS Ca 20-99. Sulfur can be determined by test method ASTM D4951.

In some embodiments, the emulsion phase includes the element component in an amount of 100 parts per million (ppm) or more based on the total emulsion phase, 200 ppm or more based on the total emulsion phase, 500 ppm or more based on the total emulsion phase, 1000 ppm or more based on the total emulsion phase, or even 10,000 ppm or more based on the total emulsion phase. In some embodiments, the element component can be from 5 to 50,000 ppm based on the total emulsion phase, from 100 to 10,000 ppm based on the total emulsion phase, or even from 1000 to 40,000 ppm based on the total emulsion phase.

In some embodiments, at least a portion (e.g., including substantially all) of the element component is present as soap, which is a salt of the element and a fatty acid such as sodium oleate, magnesium stearate, combinations of these, and the like. In some embodiments, emulsion phase includes a soap component in an amount from 50 to 100,000 ppm, from 100 to 50,000 ppm, or even from 500 to 20,000 ppm. Soap content can be determined by test method AOCS Cc17-95.

In some embodiments, the emulsion phase contains no detectable phospholipid. For example, any phospholipid that may have been inherently present in the raw grain material may have been removed in an upstream process.

An emulsion phase can also include a fatty acid alkyl ester (FAAE) component including one or more fatty acid alkyl esters such as fatty acid ethyl ester (FAEE), which is an esterified (not free) fatty acid. Nonlimiting examples of fatty acid ethyl esters include one or more of ethyl linoleate, ethyl linolenate, ethyl oleate, ethyl palmitate, and ethyl stearate. In some embodiments, the amount of the one or more fatty acid alkyl esters is in the range from 0 to 30 percent by weight based on the total weight of the emulsion phase, from 0.5 to 20 percent by weight based on the total weight of the emulsion phase, or from 1 to 15 percent by weight based on the total weight of the emulsion phase.

An emulsion phase can also include a free fatty acid component including one or more free fatty acids. In some embodiments, the amount of the one or more free fatty acids is in the range from 0 to 30 percent by weight based on the total weight of the emulsion phase, from 0.5 to 20 percent by weight based on the total weight of the emulsion phase, or from 1 to 15 percent by weight based on the total weight of the emulsion phase. Free fatty acid can be determined by test method AOCS Ca 5a-40.

The emulsion phase may be used as-is, dried to an anhydrous oily emulsion product, or dried and de-oiled to provide a solid emulsion product (e.g., solvent extracted to yield a de-oiled powder). Where the emulsion phase is dried, e.g. by evaporation in an evaporator, the removed water can be recycled for re-use in the refining process. Water recycling results in substantially no discharge water. In embodiments, the water is recycled without the need for treatment. In some embodiments, drying is performed using a wiped film evaporator to minimize heat degradation of the product if degradation is to be minimized.

Drying of the emulsion phase results in a concentrated emulsion product, which may include triglycerides, diglycerides, monoglycerides, free fatty acids, and fatty acid soaps. De-oiling the emulsion product further concentrates the emulsion product. In some embodiments, a dried and de-oiled emulsion comprises primarily soaps in powder form.

Figure 5:
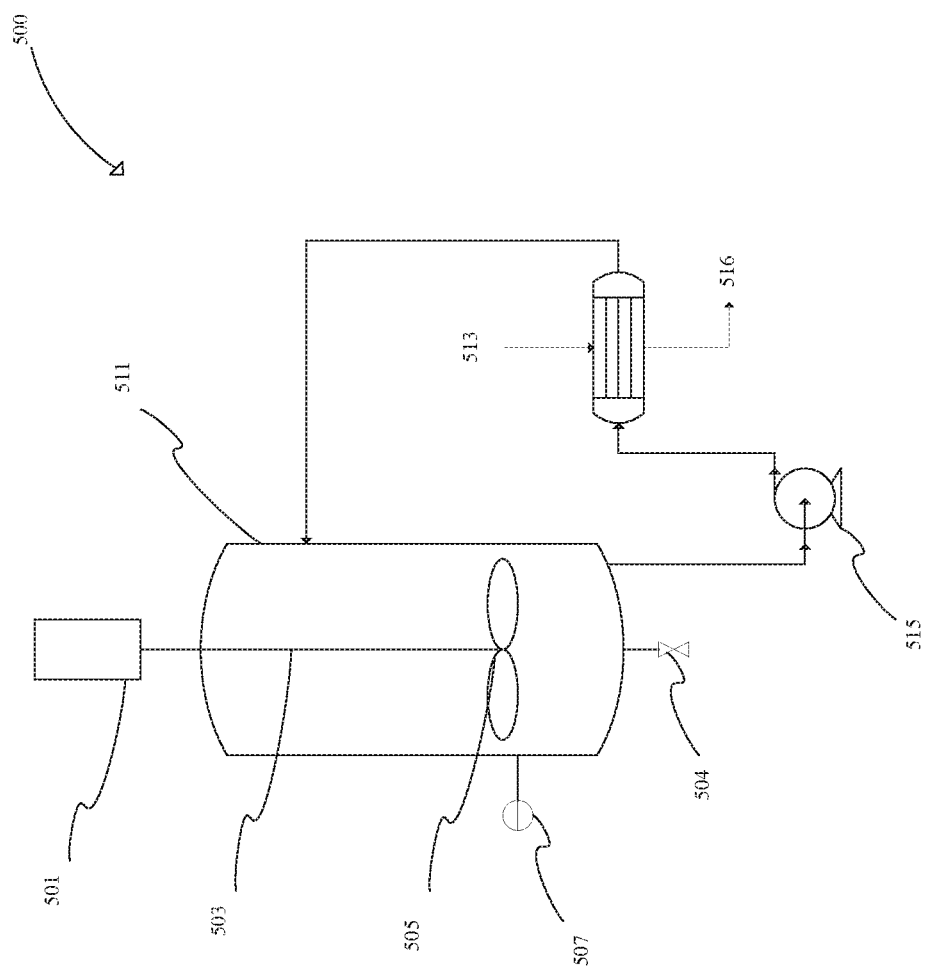
FIG. 5 is a schematic process flow diagram illustrating an embodiment of at least partially dehydrating an emulsion phase according to the present disclosure.

FIG. 5 illustrates an energy saving embodiment of a system 500 for removing water from the emulsion by heating the emulsion to form an at least partially dehydrated emulsion layer/phase and an aqueous layer/phase. As shown in FIG. 5, an emulsion can be provided in an insulated tank 511 and mixed using a mixing system that includes mixer motor 501, mixer shaft 503, and mixer blades 505. The temperature of the emulsion can be adjusted, e.g., from 80° C. to 100° C. by, e.g., circulating the emulsion through a heat exchanger 513 via a pump 515. Hot water or steam is supplied to the heat exchanger to heat the emulsion. Steam condensate 516 can be directed as desired. The temperature can be monitored using temperature sensor 507. The emulsion can be kept at from 80° C. to 100° C. and mixed for a time period to cause a desired separation of the emulsion into an aqueous phase and a dehydrated emulsion phase. In some embodiments, the emulsion can be mixed for a time period of 5 minutes to 2 hours. After mixing, the contents can settle for a time period (e.g., from 15 minutes to an hour) to allow the dehydrated emulsion phase and aqueous phase to form. The aqueous phase may be drained via drain valve 504. Alternatively, the emulsion phase can be heated without mixing to form the dehydrated emulsion phase and aqueous phase but it may take longer. As yet another alternative, the emulsion phase to be heated to evaporate moisture but that may require more energy.

In some embodiments, a dehydrated emulsion product can have a moisture content of 1% or less based on the total weight of the dehydrated emulsion product and.

In some embodiments, the dehydrated emulsion product includes a moisture content of 20 percent or less by weight of the total dehydrated emulsion product, 10 percent or less by weight of the total dehydrated emulsion product, 5 percent or less by weight of the total dehydrated emulsion product, 1 percent or less by weight of the total dehydrated emulsion product, or even 0.5 percent or less by weight of the total dehydrated emulsion product. In some embodiments, the moisture content can be from 0.01 to 5 percent by weight of the total dehydrated emulsion product, from 0.01 to 1 percent by weight of the total dehydrated emulsion product, from 0.01 to 0.5 percent by weight of the total dehydrated emulsion product, or even from 0.1 to 0.5 percent by weight of the total dehydrated emulsion product. Moisture content can be determined by a Karl Fischer titration (e.g., following ASTM E1064-12 or AOCS 2e-84).

In some embodiments, a dehydrated emulsion product can have at least 100 ppm of an element component, wherein the element component comprises at least one element chosen from calcium, phosphorus, potassium, sodium, and combinations thereof.

Optionally, a grain oil composition (e.g., grain oil composition feedstock and/or oil phase (grain oil product)) and/or a byproduct of a grain oil composition (e.g., emulsion phase and/or dehydrated emulsion phase) can be further treated by one or more processes. Nonlimiting examples of such processes include one or more filtering, bleaching, deodorizing and/or homogenizing (to reduce separation) to improve its usefulness in various applications.

A variety of bleaching processes can be used. Nonlimiting examples include one or more of hydrogen peroxide treatment, activated charcoal plus hydrogen peroxide treatment, and air/heat treatment.

An example of a hydrogen peroxide protocol includes mixing a grain oil composition and/or a byproduct of a grain oil composition with 10 vol % of 30% hydrogen peroxide. The mixture can be heated with vigorous stirring to a temperature that causes the water to boil. The mixture can be boiled until a temperature of greater than 130° C. is achieved and all boiling has stopped. The amount of peroxide can be varied, which can result in varying degrees of color change.

An example of an activated charcoal plus hydrogen peroxide includes mixing a grain oil composition and/or a byproduct of a grain oil composition mixed with 2.5 mass % activated charcoal and heating the mixture to 85° C. for 1 hour while mixing. The mixture can be filtered while hot to remove the charcoal. The treated oil can then be combined with 10 vol % of 30% hydrogen peroxide. The mixture can be heated with vigorous stirring to a temperature that causes the water to boil. The mixture can be boiled until a temperature of greater than 130° C. is achieved and all boiling has stopped. The amount of peroxide can be varied, which can result in varying degrees of color change.

An example of air/heat treatment protocol includes sparging a grain oil composition and/or a byproduct of a grain oil composition with compressed air (e.g., at a flowrate of 1 L/min) while heating to a temperate of about 190° C. for a sufficient time period (e.g., about an hour).

Using a Grain Oil Composition and/or a Byproduct of a Grain Oil Composition

A grain oil composition such as grain oil product produced by a method of refining according to the present disclosure can be used in a wide variety of applications. Such exemplary applications include the areas of oleochemicals, feed (e.g., animal feed) as well as oils suitable for human consumption, an anti-foam agent, and a carrier (e.g., a bio-based mineral oil replacement). In some embodiments, the grain oil composition is a valuable diesel fuel feedstock such as for biodiesel, renewable diesel, low sulfur fuel oil, and co-processing with hydrocarbon stocks. The refined oil can be more compatible with diesel processes than is other distillers oil, e.g. distillers corn oil, because it is less likely to poison catalysts, e.g., due to reduced metal content in the refined oil.

In some embodiments, the grain oil product can be used for asphalt modification, rubber modification, and as a lubricant.

In some embodiments, the grain oil product can be used as a nutrition source. For example, the refined oil may be used in animal and human food formulations. In some embodiments, the refined oil may be used for in pharmaceutical preparations.

A by-product of a grain oil composition produced as a result of refining according to the present disclosure (e.g., an emulsion phase and/or a dehydrated emulsion) can be used for a variety of purposes as well. For example, it has been found that the emulsion and emulsion products behave much like lecithin. The emulsion and emulsion products are believed to be useful, like lecithin, in a variety of applications and perform an array of valuable functions. In edible compositions, they may contribute nutritional value and also can act as an emulsifying agent, surface active agent, anti-spattering-agent, or stabilizing agent. They may be used in technical applications as an anti-foam agent, dispersing agent, wetting agent, stabilizing agent, anti-knock compound, mold release and antioxidant. In cosmetics and pharmaceuticals, they may be used as stabilizer, emollient, emulsifier, wetting agent, softening agent, carrier, and penetration enhancer.

Using a Grain Oil Composition and/or by-Product of a Grain Oil Composition to Control Foam in Foamable Compositions A grain oil composition and/or by-product of a grain oil composition as described herein can be used in the context of an anti-foam to help control (prevent or reduce) foaming in a variety of foamable compositions. "Anti-foam" and "defoamer" are used interchangeably herein. Anti-foam/defoamer formulations can be oil based. For example, oil based anti-foam compositions can be used to control foam in water based systems.

In some embodiments, an anti-foam composition according to the present disclosure includes a grain oil derived from a fermentation product. In some embodiments, the grain oil can include one or more (blends) of any of the grain oil compositions and byproducts of a grain oil composition as described herein. Nonlimiting examples of grain oil composition include a grain oil composition feedstock or a grain oil product (light phase) as described herein. Nonlimiting examples of a by-product of grain oil composition include an emulsion phase or a dehydrated emulsion phase (heavy phase) as described herein above. Blends of one or more of these grain oils can also be used. In some embodiments, the heavy phase can provide better foam reduction as shown in, e.g., Table 5 in the Examples section below.

However, the light phase may be desirable in cases where downstream processes include catalysts that can be poisoned by metals that may be present in the heavy phase.

In some embodiments, the light phase and/or heavy phase can also be used as a carrier oil component in defoamer compositions containing other active ingredients.

In some embodiments, one or more additional oils can be combined with a grain oil derived from a fermentation product to form a carrier oil component. Selection of a carrier oil can be for many different reasons including price, availability, biodegradability, and being a renewable product rather than a petroleum based product. A wide variety of plant and non-plant oils can included in the carrier oil component. For example, the carrier oil component can also include mineral oil. The light phase and/or heavy phase described herein can also be used to replace at least a portion of mineral oil as a carrier oil component in defoamer compositions containing other active ingredients. For example, a grain oil derived from a fermentation product can be mixed with mineral oil in a wide range of amounts to form an anti-foam composition that can flow and spread throughout a composition so as to reduce or prevent the foaming of the composition. In some embodiments, the weight ratio of the grain oil derived from a fermentation product to the mineral oil can be in the range from to 1:90 to 1:1 or even less than 1:1, or even from 1:4 to less than 1:1.

A grain oil derived from a fermentation product can be combined with one or more anti-foaming ingredients/additives in a wide range of amounts depending on the final application.

Nonlimiting examples of anti-foaming ingredients/additives include dimethylpolysiloxane, formaldehyde polyacrylic acid; mineral oil; polyethylene glycol (400) dioleate; [alpha]-hydro-omega-hydroxy-poly (oxyethylene)/poly (oxypropylene) (minimum 15 moles)/poly(oxyethylene); polyethylene glycol; polyoxyethylene 40 monostearate; polysorbate 60; polysorbate 65; propylene glycol alginate; silicon dioxide; sorbitan monostearate; aluminum stearate; butyl stearate; BHA; BHT; calcium stearate; fatty acids; formaldehyde; hydroxylated lecithin; isopropyl alcohol; magnesium stearate; petroleum wax; oleic acid; synthetic isoparaffinic petroleum hydrocarbons; oxystearin; polyoxyethylene dioleate; polyoxyethylene monoricinoleate; polypropylene glycol; polysorbate 80; potassium stearate; propylene glycol mono- and diesters of fats and fatty acids; soybean oil fatty acids(hydroxylated); tallow (hydrogenated, oxidized or sulfated), and mixtures thereof. In some embodiments, an anti-foam composition includes at least one hydrophobic particle component. A hydrophobic particle component can include hydrophobic wax particles, one or more hydrophobic silica particles, and mixtures thereof. In some embodiments, an anti-foam composition contains no detectable amount of phospholipid.

An anti-foam composition can be provided with a viscosity to facilitate one or more functions such as storage, transfer, application, and ability to prevent or reduce foam. A desirable viscosity or range of viscosities can depend on a variety of factors. Also, an anti-foam composition can be blended with one or more compositions to modify its viscosity. For example, if a grain oil derived from a fermentation product (e.g., dehydrated emulsion phase) is too thick, e.g., to pump, a grain oil derived from a fermentation product could be blended with mineral oil to reduce viscosity. Material handling issues, such as a thick vegetable oil anti-foam composition not flowing out of a tank or railcar could also be alleviated by adding mineral oil to reduce viscosity. Also, a lower viscosity anti-foam may disperse in a composition to be treated better than a higher viscosity antifoam. For example, an anti-foam with the viscosity of toothpaste may not disperse as readily as a lower-viscosity antifoam (when added to a process stream that needs to be defoamed or when added to the top of a foaming tank).

In some embodiments, an anti-foam composition and/or at least one of the grain oil composition or the byproduct of a grain oil composition has a Brookfield viscosity in the range from 10-300 centiPoise (cP) when measured at 22° C. and 100 rpm with a #31 spindle. In some embodiments, an anti-foam composition and/or at least one of the grain oil composition or the byproduct of a grain oil composition has a Brookfield viscosity in the range from 5-100 centiPoise (cP) when measured at 22° C. and 100 rpm with a #18 spindle. In some embodiments, an anti-foam composition and/or at least one of the grain oil composition or the byproduct of a grain oil composition has a Brookfield viscosity in the range from 5-100 centiPoise (cP) when measured at 22° C. and 50 rpm with a #18 spindle.

An anti-foam composition as described herein can be used to control foam in a foamable composition by mixing an amount of an anti-foam composition with the foamable composition to prevent, mitigate, or reduce foaming of the foamable composition. Foamable compositions that can benefit from an anti-foam composition include compositions that foam when subjected to agitation or mixing. Nonlimiting examples of foamable composition include one or more of aerobic digestion streams, wastewater treatment; manure pit foam; pulp and paper processing; coatings; paint; agrochemicals; food and beverage manufacturing; and one or more biorefinery compositions/process streams such as a stillage composition/stream.

One example of a stillage composition includes a stillage composition derived from processing "cellulosic biomass" such as corn stover. A stillage composition derived from corn stover includes fermenting a cellulosic mash to form a cellulosic beer; separating the cellulosic beer into a liquid stillage stream and a lignin cake stream. The liquid stillage stream can be mixed with an amount of an anti-foam composition as described herein to reduce foaming.

The amount of anti-foam composition to combine with a foamable composition can vary depending on the type of foamable composition, the process conditions, and the like. In some embodiments, the anhydrous heavy phase is added at a rate of 10-500 ppm, 20-300 ppm, 50-200 ppm, or approximately 100 ppm.

Mineral Oil Replacement

Embodiments of the present disclosure also include reducing the amount of mineral oil carrier in a wide variety of compositions by replacing at least a portion of the mineral oil carrier in the composition with an amount of a grain oil composition derived from a fermentation product. The amount of mineral oil replace can depend on a variety of factors such as cost and functionality (e.g., viscosity). In some embodiments, the weight ratio of mineral oil replaced to the amount of a grain oil composition derived from a fermentation product is in the range from 0.5:1 to 1.5:1.

Following are exemplary embodiments of the present disclosure:

1. A method of refining a grain oil composition feedstock to provide a grain oil product, wherein the method comprises:
   combining the grain oil composition feedstock with water to form an oil-water mixture having water in an amount of 5-50% based on the total volume of the oil-water mixture (v/v), wherein the grain oil composition comprises an impurity component;
   exposing the oil-water mixture to a temperature in the range from 0° C. to 50° C. for a time period at least until the oil-water mixture forms at least an oil phase and an emulsion phase; and
   recovering at least a portion of the oil phase from the emulsion phase to form the grain oil product, wherein an amount of the impurity component in the emulsion phase is greater than an amount of the impurity component in the grain oil product.

2. The method of embodiment 1, wherein the water is in an amount of 15-25% based on the total volume of the oil water mixture (v/v).

3. The method of any preceding embodiment, wherein the oil-water mixture is exposed to a temperature in the range from 20° C. to 30° C.

4. The method of any preceding embodiment, wherein the time period is from 5 minutes to 5 hours.

5. The method any preceding embodiment, wherein recovering at least a portion of the oil phase from the emulsion phase to form the grain oil product comprises passing the emulsion phase and the oil phase through at least one centrifuge to separate at least a portion of the oil phase from the emulsion phase to form the grain oil product.

6. The method of any preceding embodiment, wherein the emulsion phase comprises water, oil, and at least a portion of the impurity component.

7. The method of any preceding embodiment, wherein the impurity component comprises at least one impurity chosen from phospholipids, metals, free fatty acids, esters, soaps, gums, waxes, phosphatides, sterols, odiferous volatiles, colorants, and combinations thereof.

8. The method of any preceding embodiment, wherein the impurity component comprises an element component, wherein the element component comprises at least one element chosen from calcium, phosphorus, potassium, sodium, magnesium and combinations thereof.

9. The method of embodiment 8, wherein the grain oil product comprises no more than 100 ppm of the element component, and wherein the emulsion phase comprises at least 100 ppm of the element component.

10. The method of embodiments 8 or 9, wherein at least a portion of the element component is present as soap.

11. The method of any preceding embodiment, wherein the grain oil composition feedstock comprises a triglyceride component present in an amount of at least 70 percent by weight of the grain oil composition feedstock.

12. The method of any preceding embodiment, wherein the grain oil composition feedstock and/or the grain oil product have a moisture content of 30 weight percent or less.

13. The method of any preceding embodiment, wherein the grain oil composition feedstock and/or grain oil product contain no detectable phospholipid.

14. The method of any preceding embodiment, wherein the grain oil composition feedstock is derived from a grain chosen from corn, barley, rice, wheat, soybean, rapeseed, rye, and combinations thereof.

15. The method of any preceding embodiment, wherein the grain oil composition feedstock is derived from a fermentation product, wherein the fermentation product is a stillage composition, wherein the stillage composition is derived from a grain material, wherein the grain material is chosen from corn, barley, rice, wheat, soybean, rapeseed, rye, and combinations thereof, and wherein the stillage composition is chosen from whole stillage, thin stillage, wet cake, syrup, and combinations thereof.

16. The method of embodiment 15, wherein the fermentation product is derived from a method comprising fermenting a grain mash composition to form a beer comprising a biochemical, wherein the grain mash composition comprises grain solids, grain oil and sugar, wherein fermenting comprises fermenting the grain mash in the presence of one or more enzymes to generate one or more fatty acid alkyl esters.

17. The method of embodiment 16 wherein the one or more enzymes are chosen from lipase, esterase, and combinations thereof, wherein the one or more enzymes are endogenous enzymes and/or exogenous enzymes, and wherein the one or more fatty acid alkyl esters comprise one or more fatty acid ethyl esters.

18. The method of embodiments 15, 16, or 17, wherein grain oil composition feedstock is derived from whole stillage by a method comprising:
separating whole stillage into thin stillage and wet cake;
optionally evaporating at least a portion of water from the thin stillage to condense the thin stillage into a syrup;
separating the thin stillage or syrup into a first oil fraction and a first aqueous fraction; and
adjusting pH of the first oil fraction to separate the first oil fraction into a second oil fraction and a second aqueous fraction, wherein the second oil fraction is the grain oil composition feedstock.

19. The method of embodiment 18, wherein the grain oil composition feedstock is at a temperature greater than 70° C., and further comprising cooling the grain oil composition feedstock to a temperature in the range from 0° C. to 50° C.

20. The method of any preceding embodiment, wherein the oil phase has a first bulk density and the emulsion phase has a second bulk density, wherein the first bulk density is less than the second bulk density.

21. The method of any preceding embodiment, further comprising dehydrating the emulsion phase to produce a dehydrated emulsion product, wherein the dehydrated emulsion product comprises:
a moisture content of 1% or less based on the total weight of the dehydrated emulsion product;
a triglyceride component; and
at least 100 ppm of an element component, wherein the element component comprises at least one element chosen from calcium, phosphorus, potassium, sodium, and combinations thereof.

22. The method of embodiment 21, further comprising mixing at least one anti-foaming ingredient with the grain oil composition feedstock, the grain oil product, the emulsion phase, the dehydrated emulsion product, or blends thereof to form an anti-foam composition.

23. The method of any preceding embodiment, further comprising filtering the grain oil product to remove at least a portion of a particle component.

24. A system for refining a grain oil composition feedstock comprising:
a) a source of a grain oil composition feedstock, wherein the grain oil composition comprises an impurity component;
b) a source of water;
c) a first system in fluid communication with the source of the grain oil composition and the source of the water, wherein the first system is configured to:
i) combine and mix the grain oil composition and the water to form an oil-water mixture having water in an amount of 5-50% based on the total volume of the oil water mixture (v/v); and
ii) expose the oil-water mixture to a temperature in the range from 0° C. to 50° C. for a time period at least until the oil-water mixture forms at least an oil phase and an emulsion phase; and
d) a separation system configured to recover at least a portion of the oil phase from the emulsion phase to form the grain oil product.

25. The system of embodiment 24, wherein the first system comprises one or more static mixers, impeller mixers, pumps, shear mixers, tank recirculation loops, tank mixers, and combinations thereof.

26. The system of embodiments 24 or 25, wherein the separation system comprises one or more centrifuges, decanter centrifuges, disk stack centrifuges, screen centrifuges, hydrocyclones, and combinations thereof.

27. The system of any of embodiments 24-26, further comprising:
a) a distillation system configured to provide a source of whole stillage stream;
b) a first separation system in fluid communication with the distillation system and configured to separate the whole stillage stream into a thin stillage stream and a wet cake stream;
c) an evaporation system in fluid communication with the first separation system and configured to condense the thin stillage stream into a syrup stream;
d) a second separation system in fluid communication with the evaporation system and configured to separate the syrup stream into a first aqueous phase stream and a first oil phase stream; and e) a third separation system in fluid communication with the second separation system and configured to separate the first oil phase stream into a second aqueous phase stream and a second oil phase stream, wherein the second oil phase stream is the source of the grain oil composition feedstock, wherein the separation system configured to recover at least a portion of the oil phase from the emulsion phase is a fourth separation system.

28. The system of any of embodiments 24-27, wherein at least one of the first separation system, second separation system, and third separation system comprises one or more centrifuges, decanter centrifuges, disk stack centrifuges, screen centrifuges, hydrocyclones, and combinations thereof.

29. An anti-foam composition comprising:
a) a carrier oil component comprising a grain oil derived from a fermentation product, wherein the grain oil is chosen from a grain oil composition, a byproduct of a grain oil composition, and mixtures thereof; and
b) at least one anti-foaming ingredient.

30. The anti-foam composition of embodiment 29, wherein at least one of the grain oil composition or the byproduct of a grain oil composition comprises a fatty acid alkyl ester component, wherein the fatty acid alkyl ester component comprises one or more fatty acid alky esters.

31. The anti-foam composition of embodiments 29 or 30, wherein the fatty acid alkyl ester component is present in an amount of 0.1 percent or more by weight based on the total weight of the anti-foam composition.

32. The anti-foam composition of embodiment 29, 30, or 31, wherein at least one of the grain oil composition or the byproduct of a grain oil composition further comprises a free fatty acid component comprising one or more free fatty acids, wherein the free fatty acid component is present in an amount of at least 0.1 percent or more by weight based on the total weight of the anti-foam composition.

33. The anti-foam composition of embodiment 32, wherein the free fatty acid component and the fatty acid alkyl ester component are generated during a grain ethanol production process, wherein the free fatty acid component and/or fatty acid alkyl ester component are endogenous and/or chemically formed in-situ.

34. The anti-foam composition of any of embodiments 29-33, wherein at least one of the grain oil composition or the byproduct of a grain oil composition is derived from distiller's corn oil.

35. The anti-foam composition of any of embodiments 29-34, wherein the anti-foam composition contains no detectable amount of phospholipid.

36. The anti-foam composition of any of embodiments 29-34, wherein the anti-foaming ingredient comprises a hydrophobic particle component.

37. The anti-foam composition of embodiment 36, wherein the hydrophobic particle component is chosen from one or more hydrophobic wax particles, one or more hydrophobic silica particles, and mixtures thereof.

38. The anti-foam composition of any of embodiments 29-37, wherein at least one of the grain oil composition or the byproduct of a grain oil composition further comprise an element component, wherein the element component comprises at least one element chosen from calcium, phosphorus, potassium, sodium, and combinations thereof.

39. The anti-foam composition of embodiment 38, wherein at least a portion of the element component is present as soap.

40. The anti-foam composition of any of embodiments 29-39, wherein the anti-foam composition and/or at least one of the grain oil composition or the byproduct of a grain oil composition has a Brookfield viscosity in the range from 10-300 centiPoise (cP) when measured at 22° C. and 100 rpm with a #31 spindle.

41. The anti-foam composition of any of embodiments 29-40, wherein the anti-foam composition and/or at least one of the grain oil composition or the byproduct of a grain oil composition has a Brookfield viscosity in the range from 5-100 centiPoise (cP) when measured at 22° C. and 100 rpm with a #18 spindle.

42. The anti-foam composition of any of embodiments 29-41, wherein the anti-foam composition and/or at least one of the grain oil composition or the byproduct of a grain oil composition has a Brookfield viscosity in the range from 5-100 centiPoise (cP) when measured at 22° C. and 50 rpm with a #18 spindle.

43. The anti-foam composition of any of embodiments 29-42, wherein the carrier oil component further comprises mineral oil.

44. The anti-foam composition of embodiment 43, wherein the weight ratio of the grain oil composition and/or the byproduct of a grain oil composition to the mineral oil is in the range from to 1:90 to 1:1.

45. The anti-foam composition of any of embodiments 29-44, wherein the carrier oil component comprises the grain oil derived from a fermentation product in an amount from 50 to 100 percent by weight of the total carrier oil component.

46. A method of controlling foam in a foamable composition, wherein the method comprises mixing a grain oil with the foamable composition to prevent, mitigate, or reduce foaming of the foamable composition, wherein the grain oil is derived from a fermentation product, and wherein the grain oil is chosen from a grain oil composition, a byproduct of a grain oil composition, and mixtures thereof.

47. The method of embodiment 46, wherein at least one of the grain oil composition and the byproduct of a grain oil composition has a fatty acid alkyl ester component.

48. The method of embodiments 46 or 47, wherein the foamable composition is a stillage composition.

49. The method of embodiment 46, 47, or 48, wherein the stillage composition is a liquid stillage stream provided by a process comprising:
a) fermenting a cellulosic mash to form a cellulosic beer;
b) separating the cellulosic beer into a liquid stillage stream and a lignin cake stream;
c) mixing the liquid stillage stream with an amount of at least one of the grain oil composition and the byproduct of a grain oil composition to reduce foaming.

50. The method of embodiment 49, wherein the cellulosic mash is derived from ground corn stover.

51. The method of any of embodiments 46-50, wherein the fatty acid alkyl ester component comprises one or more more fatty acid alkyl esters, and wherein the fatty acid alkyl ester component is present in an amount of 10 percent or more by weight based on the total weight of the grain oil composition or the byproduct of a grain oil composition.

52. A method of reducing the amount of mineral oil carrier in a composition, wherein the method comprises replacing at least a portion of the mineral oil carrier in the composition with an amount of a grain oil composition derived from a fermentation product.

53. The method of embodiment 52, wherein the weight ratio of mineral oil replaced to the amount of a grain oil composition derived from a fermentation product is in the range from 0.5:1 to 1.5:1.

54. The method of embodiment 52 or 53, wherein all of the mineral oil is replaced with the grain oil composition derived from a fermentation product.

EXAMPLES

The following examples are intended to illustrate different aspects and embodiments of the present disclosure. It will be recognized that various modifications and changes may be made from the experimental embodiments described herein without departing from the scope of the claims.

Example 1

Distiller's corn oil from five different sources was obtained and tested as described herein. To each 50 ml centrifuge tube were added 40 ml of room temperature distiller's corn oil and 10 ml of water (RO) to make a 20 vol % mixture of water and oil. The mixture was vigorously mixed using a vortex mixer to form an emulsion. Each of the tubes were centrifuged on a bench top centrifuge that had been chilled to 4° C. and spun at 4500 rpm for 30 minutes. Each sample was removed from the centrifuge and using vacuum suction the supernatant from the top was removed from each tube. The process resulted in a clarified, light phase (top layer) (corn oil product) and a heavy phase (bottom layer) (emulsion phase). Table 1 shows the percentage of the clarified, light phase and heavy phase.

TABLE 1

| Sample ID | % Clarified Phase | % Heavy Phase |
|---|---|---|
| DCO 1 | 96.57 | 3.43 |
| DCO 2 | 89.90 | 10.10 |
| DCO 3 | 92.86 | 7.14 |
| DCO 4 | 79.25 | 20.75 |
| DCO 5 | 93.27 | 6.73 |
| Mean | 90.37 | 9.63 |

Table 2 shows the concentration of metals in ppm for each of the sample oils before the treatment with water and separation.

TABLE 2

| Sample ID | Calcium | Magnesium | Phosphorus | Potassium | Sodium |
|---|---|---|---|---|---|
| DCO 1 | 13 | 103 | 49 | 40 | 81 |
| DCO 2 | 10 | 64 | 41 | 30 | 60 |
| DCO 3 | 1 | 10 | 6 | 44 | 72 |
| DCO 4 | 45 | 219 | 142 | 37 | 111 |
| DCO 5 | 1 | 10 | 7 | 25 | 53 |

Table 3 show the concentration of metals in ppm for each of the sample oils after the treatment with water and separation as measured in the clarified, light phase.

TABLE 3

| Sample ID | Calcium | Magnesium | Phosphorus | Potassium | Sodium |
|---|---|---|---|---|---|
| DCO 1 Clarified | <1 | 1 | 3 | 2 | 3 |
| DCO 2 Clarified | <1 | 2 | 3 | <2 | 4 |
| DCO 3 Clarified | <1 | 1 | 3 | 5 | 7 |

TABLE 3-continued

| Sample ID | Calcium | Magnesium | Phosphorus | Potassium | Sodium |
|---|---|---|---|---|---|
| DCO 4 Clarified | 1 | 7 | 5 | 4 | 9 |
| DCO 5 Clarified | <1 | 1 | 3 | 5 | 5 |

The metals were determined according to AOCS Ca 17-01, were xylene was used as the solvent.

Example 2

Distiller's corn oil obtained from a fermentation plant passed through a heat exchanger to cool/heat the oil to ~65° F. Water was introduced into a pipe at a rate to make a 15 vol % water solution. The oil/water mix was passed through an inline pipe mixer to form an emulsion. The mixed oil/water mixture was then processed through a nozzle clarifier centrifuge resulting in a clarified light phase (corn oil product) and a heavy phase (emulsion phase). The light and heavy phase was split 79% clarified phase and 21% heavy phase.

Table 4 shows the metals for untreated distiller corn oil (DCO) compared to distillers corn oil processed (DCO clarified).

TABLE 4

| Sample ID | Calcium | Magnesium | Phosphorus | Potassium | Sodium |
|---|---|---|---|---|---|
| DCO | 18 | 125.5 | 82.5 | 46.5 | 98.5 |
| DCO Clarified | 2.9 | 5.8 | 3.1 | 3.3 | 2.5 |

It can be seen that the addition of water in the separation process aids in reducing the metal content in the clarified oil phase.

Example 3

Samples of a heavy phase (emulsion phase as obtained from the preparation of the oil/water mixture and then separated as described in Example 1) were dried by evaporating the water on a hot plate. The oil was Voila® corn oil. The dried emulsion was then bleached using heat and the addition of hydrogen peroxide to produce a material with a lighter color that when re-emulsified with water appeared white. The dried emulsion was extracted with acetone yielding an oil fraction and a de-oiled precipitate fraction.

Example 4

Samples of the heavy phase (emulsion phase as obtained from the preparation of the oil/water mixture and then separated) were dried via evaporation to form an anhydrous heavy phase. The anhydrous heavy phase was used in place of a commercial anti-foam product. The anhydrous heavy phase was trickled into a waste water treatment process at a range of 50-200 ppm to reduce foaming during waste water treatment. Foaming was controlled to a level comparable to commercial anti-foam products typically used in waste water treatment facilities.

Example 5

FIGS. 6A through 6G and Table 5 show percent foam reduction when adding different antifoams (defoamers) at varying concentrations to an aqueous solution of sodium lauryl ether sulfate (SLES). The aqueous solution contained 0.1 mass % SLES in water. After performing an antifoam testing procedure, the volume of foam with and without antifoam was used to calculate a volume-percent foam reduction. Foam reduction data was generated based on the following modified version ASTM test method: E2407-05 (2015) Standard Test Method for Effectiveness of Defoaming Agents. The antifoam testing procedure used to measure the effectiveness of various antifoams is shown below.

Antifoam Testing Procedure:
1. Load 250 ml of substrate (0.1 mass % sodium lauryl ether sulfate (SLES) in water or other substrate) into a Wearing blender that contains a glass vessel.
2. Reduce the power to the blender to 60% of full power.
3. Blend the substrate for 30 seconds.
4. Let the blended substrate stand 3 minutes.
5. Record the liquid level in a spreadsheet.
6. Record the foam level in the spreadsheet.
7. Add the correct volume of antifoam agent to the substrate using a repeater pipette.
8. Blend the substrate and antifoam agent mixture for 30 seconds.
9. Let the substrate and antifoam agent mixture stand for 6 minutes
10. Record the liquid level in the spreadsheet.
11. Record the foam level in the spreadsheet.
12. Calculate the foam reduction using the volume of foam that remained when antifoam agent was not present (after step 4—initial foam volume) and the volume of foam that remained when antifoam agent was present (after step 9—final foam volume)*.
* Percent foam reduction was calculated by subtracting the final foam volume from the initial foam volume. This difference in volume was then divided by the initial foam volume and multiplied by 100 to obtain a volume percent foam reduction.
13. Rinse the vessel with hot water.

FIGS. 6A through 6G show volume percent foam reduction for seven different corn oil based antifoams at varying dose rates when using a model substrate (0.1 mass % SLES in water). The dose rates are reported as parts per million by volume (ppmv).

Figure 6A:
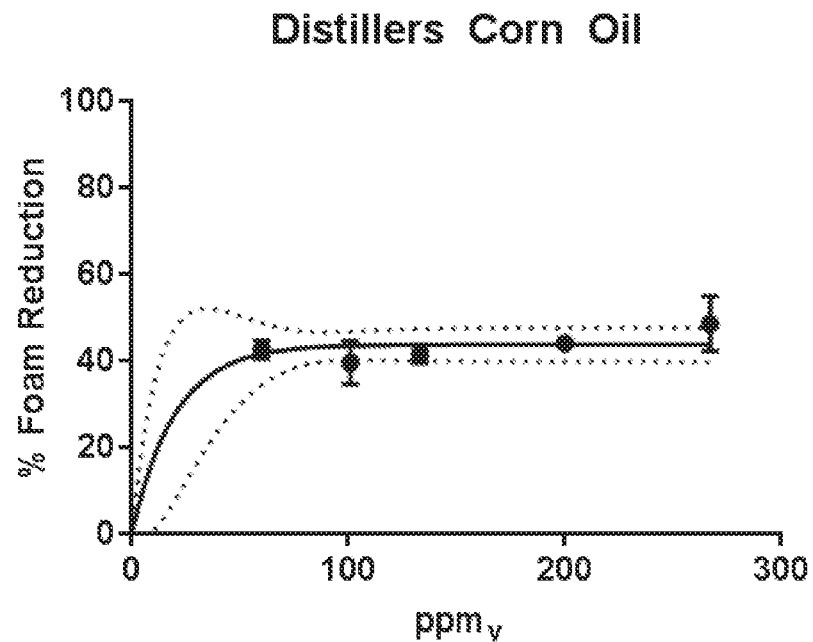
FIGS. 6A through 6G illustrate data from Example 5 and show volume percent foam reduction for seven different corn oil based antifoams at varying dose rates when using a model substrate (0.1 mass % sodium lauryl ether sulfate (SLES) in water)

FIG. 6A shows foam reduction data when using DCO having a fatty acid ethyl esters content of about 10 percent by weight based on the total weight of the DCO as antifoam.

Figure 6B:
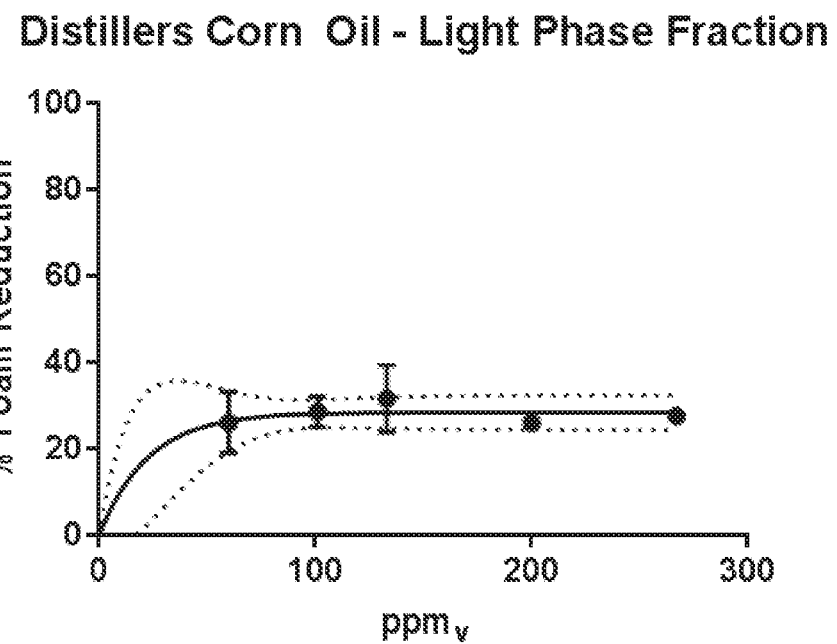

FIG. 6B shows foam reduction data when using DCO light phase fraction as anti-foam. DCO light phase fraction refers to the light phase fraction of DCO obtained from the DCO in FIG. 6A and isolated by centrifuging DCO and removing the top, clarified layer of corn oil. Alternatively, the fractions can be isolated by gravity settling DCO and removing the top, clarified layer of corn oil.

Figure 6C:
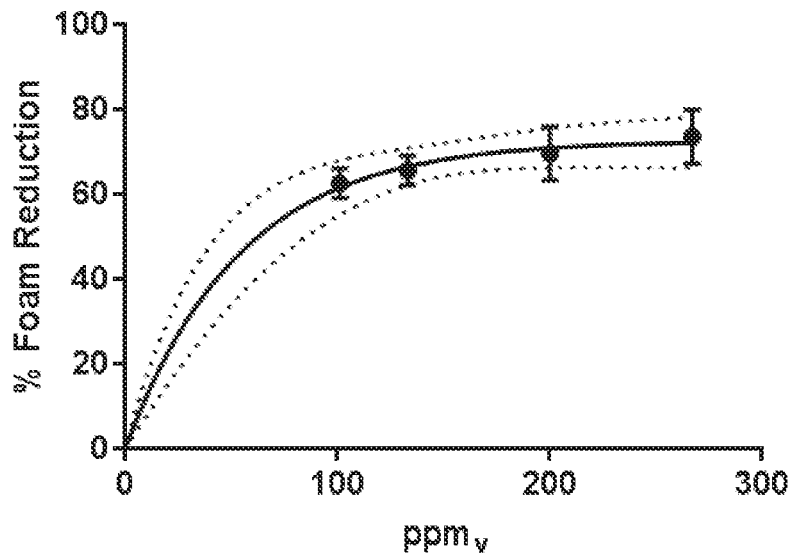

FIG. 6C shows foam reduction data when using DCO heavy phase fraction as anti-foam. DCO heavy phase fraction refers to the heavy, bottom layer of DCO obtained from the DCO in FIG. 6A.

Figure 6D:
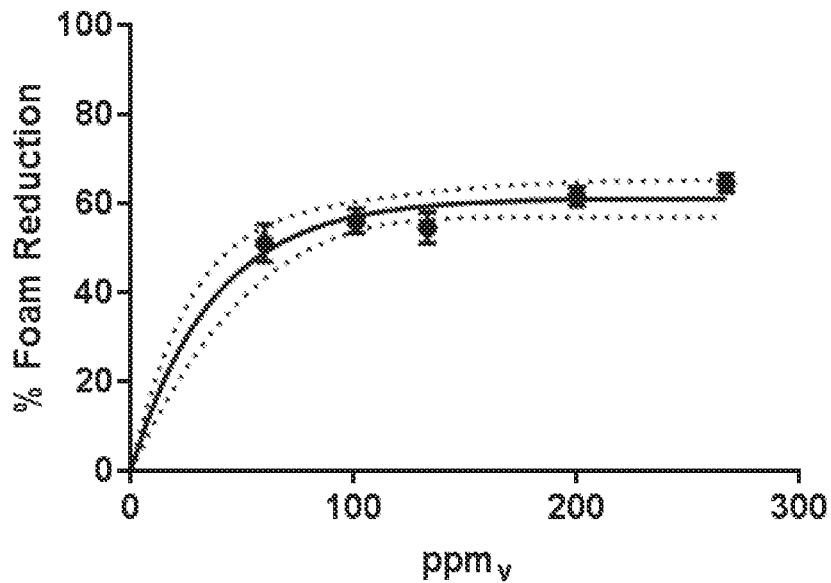

FIG. 6D shows foam reduction data when using high ethyl ester corn oil (HEECO) as anti-foam. The HEECO sample used to generate the data shown in FIG. 6D through FIG. 6G contained approximately 60% fatty acid ethyl esters. As mentioned above, HEECO can be produced by adding a lipase or esterase during the fermentation step at a biorefinery. When a lipase or esterase is added to fermentation, the corn oil that is subsequently separated contains a higher concentration of fatty acid ethyl esters and may have enhanced utility to act as an antifoam. In this example, a lipase addition of approximately 25 ppm in fermentation resulted in a corn oil that contained approximately 60% ethyl esters. Alternatively, in a process separate from fermentation, DCO can be combined with ethanol in the presence of a catalyst such as an acid, base, or lipase to generate HEECO. Comparing FIG. 6D to FIG. 6A illustrates that corn oil exposed to a lipase or esterase has enhanced antifoam capability, compared to corn oil not exposed to a lipase or esterase.

Figure 6E:
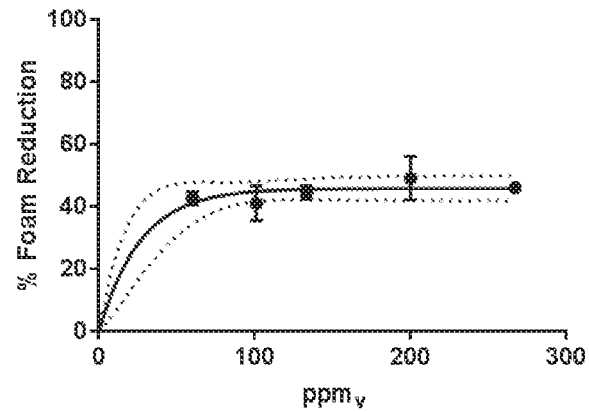

FIG. 6E shows foam reduction data when using HEECO light phase fraction as anti-foam. HEECO light phase fraction refers to the light phase fraction of a high ethyl ester corn oil and in this example was the light phase separated from the HEECO of FIG. 6D.

Figure 6F:
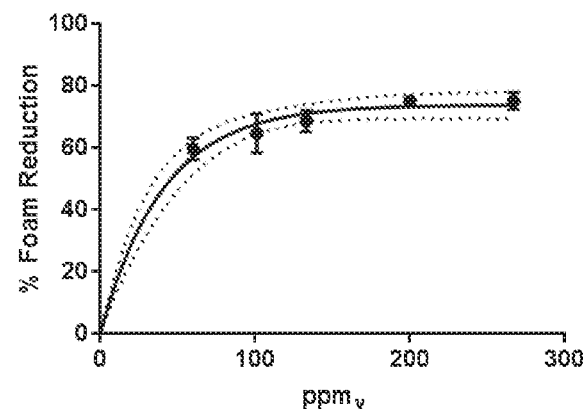

FIG. 6F shows foam reduction data when using HEECO heavy phase fraction as anti-foam. HEECO heavy phase fraction refers to the heavy phase fraction of a high ethyl ester corn oil and in this example was the heavy phase separated from the HEECO of FIG. 6D. These heavy and light phases can be isolated in a similar fashion as described above for DCO light phase fraction and DCO heavy phase fraction.

Figure 6G:
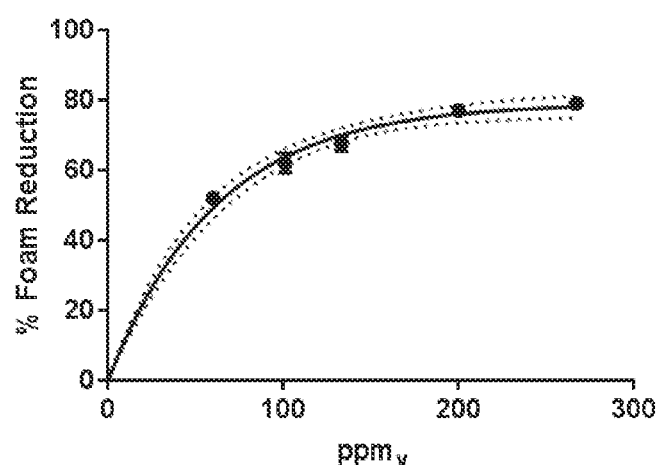

FIG. 6G shows foam reduction data for a sample that was prepared by combining HEECO heavy phase fraction with mineral oil in a ratio to form a mixture comprising approximately 25 mass % HEECO heavy phase fraction in mineral oil. In some examples, a lower concentration of HEECO heavy phase in mineral oil may be desirable, e.g., to lower the viscosity of the mixture and make the antifoam composition more flowable. Flowability may be important for applications where antifoam is pumped, transported through pipes, or removed from storage containers or vessels. In such examples, the concentration of HEECO heavy phase in mineral oil may range, e.g., from 0.01 to 25 mass %, including the end points of this range. In other examples, higher concentration of HEECO heavy phase fraction in mineral oil may be desirable, e.g., to reduce shipping costs of the HEECO heavy phase fraction active ingredient. In such examples, the concentration of HEECO heavy phase in mineral oil may range from 25 to 50 mass %, including the end points of this range.

Table 5 is a table that shows the volume percent foam reduction for DCO, DCO light phase fraction, DCO heavy phase fraction, HEECO, HEECO light phase fraction, HEECO heavy phase fraction, and a mixture of HEECO heavy phase fraction and mineral oil when using a model substrate (0.1 mass % SLES in water). The values in Table 5 are the point at which the curves in FIGS. 6A through 6G plateau. As shown in Table 5, the DCO heavy phase fraction resulted in a greater volumetric foam reduction, compared to the DCO sample. Similarly, the HEECO heavy phase fraction resulted in a greater volumetric foam reduction, compared to the HEECO sample. This result may be advantageous in that the DCO light phase fraction and the HEECO light phase fraction are clear with a homogeneous appearance. These oil characteristics may be desirable for certain vegetable oil customers. A corn oil separation process that produces a heavy phase fraction, that can be used as an anti-foam, and a light phase fraction, which is clear and homogeneous, may be beneficial because it converts a commodity corn oil into two potentially higher value products.

TABLE 5

|  | Distillers Corn Oil | DCO Light Phase Fraction | DCO Heavy Phase Fraction | High Ethyl Ester Corn Oil (HEECO) | HEECO Light Phase Fraction | HEECO Heavy Phase Fraction | HEECO Heavy Phase Fraction Mixed with Mineral Oil |
|---|---|---|---|---|---|---|---|
| Volume % Foam Reduction (Plateau) | 43.7 | 28.38 | 72.6 | 61.07 | 45.81 | 73.7 | 79.04 |
| Density | 0.916 | 0.916 | 0.934 | 0.890 | 0.883 | 0.928 | NA |

Tables 6-8 show compositional analysis for the samples shown in FIGS. 6A-6F.

Table 6 shows elemental analysis data for the following samples: DCO, DCO light phase fraction from the DCO, DCO heavy phase fraction from the DCO, HEECO, HEECO light phase fraction from the HEECO, and HEECO heavy phase fraction from the HEECO. The HEECO sample in Table 6 contained approximately 60% ethyl esters.

Table 7 shows fatty acid composition data for the following samples: DCO, DCO light phase fraction from the DCO, DCO heavy phase fraction from the DCO, HEECO, HEECO light phase fraction from the HEECO, and HEECO heavy phase fraction from the HEECO. The HEECO sample in Table 7 contained approximately 60% ethyl esters.

Table 8 shows mono- and diglyceride concentration and soap concentration data for the following sample: DCO, DCO light phase fraction from the DCO, DCO heavy phase fraction from the DCO, HEECO, HEECO light phase fraction from the HEECO, and HEECO heavy phase fraction from the HEECO. Table 8 also shows wax concentration data for a sample of DCO heavy phase fraction and a sample of HEECO heavy phase fraction. The HEECO sample in Table 8 contained approximately 60% ethyl esters. The compositional differences between the seven samples shown in Tables 6-8 may be responsible for the varying effectiveness in foam reduction when using these samples in antifoam applications.

TABLE 6

| Elemental Analysis | Distillers Corn Oil (DCO) | DCO Light Phase Fraction | DCO Heavy Phase Fraction | High Ethyl Ester Corn Oil (HEECO) | HEECO Light Phase Fraction | HEECO Heavy Phase Fraction | Units |
|---|---|---|---|---|---|---|---|
| Calcium | 38.50 | 0.98 | 25.30 | 62.50 | 37.00 | 171.00 | ppm |
| Magnesium | 232.00 | 1.76 | 83.50 | 207.00 | 32.10 | 1,810.00 | ppm |
| Phosphorus | 162.00 | 0.99 | 56.60 | 59.30 | 9.89 | 569.00 | ppm |
| Potassium | 60.10 | 15.90 | 112.00 | 103.00 | 89.40 | 293.00 | ppm |
| Sodium | 130.00 | 18.60 | 382.00 | 578.00 | 547.00 | 1,370.00 | ppm |

TABLE 7

| Fatty Acid Composition | Distillers Corn Oil (DCO) | DCO Light Phase Fraction | DCO Heavy Phase Fraction | High Ethyl Ester Corn Oil (HEECO) | HEECO Light Phase Fraction | HEECO Heavy Phase Fraction | Units |
|---|---|---|---|---|---|---|---|
| C8 Caprylic |  |  |  |  |  | 0.50 | mg FA/g |
| C10 Capric |  |  |  |  |  | 0.40 | mg FA/g |
| C14 Mytistic | 0.50 | 0.40 | 0.40 | 0.60 | 0.60 | 0.50 | mg FA/g |
| C16 Palmitic | 124.90 | 119.90 | 146.10 | 123.10 | 118.60 | 168.70 | mg FA/g |
| C16:1n7 Palmitoleic | 1.70 | 1.70 | 1.50 | 1.60 | 1.60 | 1.20 | mg FA/g |
| C17 Margaric | 0.60 | 0.70 | 0.80 | 0.60 | 0.60 | 0.90 | mg FA/g |
| C18 Stearic | 18.00 | 17.60 | 22.00 | 18.10 | 17.20 | 26.40 | mg FA/g |
| C18:1n9 Oleic | 248.10 | 253.60 | 231.40 | 234.10 | 241.00 | 192.40 | mg FA/g |
| C18:1n7 Vaccenic | 4.90 | 5.40 | 4.40 | 5.50 | 4.70 | 4.30 | mg FA/g |
| C18:2 Linoleic | 484.30 | 492.90 | 446.80 | 448.10 | 460.60 | 363.80 | mg FA/g |
| C18:3n3 alpha-Linolenic | 11.90 | 12.40 | 11.20 | 11.70 | 12.00 | 9.40 | mg FA/g |
| C20 Arachidic | 3.80 | 3.60 | 4.50 | 3.70 | 3.40 | 6.20 | mg FA/g |
| C20:1 Eicosenoic | 3.20 | 3.30 | 2.90 | 3.20 | 3.30 | 2.70 | mg FA/g |
| C20:2n6 Eicosadienoic | 0.30 | 0.30 | 0.20 | 0.30 | 0.40 | 0.30 | mg FA/g |
| C22 Behinic | 1.60 | 1.30 | 2.90 | 1.60 | 1.30 | 4.00 | mg FA/g |
| C24 Lignoceric | 2.00 | 1.70 | 3.40 | 2.10 | 1.80 | 5.00 | mg FA/g |
| Others | 1.60 | 2.40 | 1.80 | 2.60 | 3.00 | 2.50 | mg FA/g |
| Total Fatty Acid | 907.40 | 917.20 | 880.30 | 856.90 | 870.10 | 789.20 | mg FA/g |
| Total Saturates | 151.40 | 145.20 | 180.10 | 149.80 | 143.50 | 212.60 | mg FA/g |
| Total Monounsaturates | 257.90 | 264.00 | 240.20 | 244.40 | 250.60 | 200.60 | mg FA/g |
| Total Polyunsaturates | 496.50 | 505.60 | 458.20 | 460.10 | 473.00 | 373.50 | mg FA/g |
| Total Omega 3 | 11.90 | 12.40 | 11.20 | 11.70 | 12.00 | 9.40 | mg FA/g |

TABLE 7-continued

| Fatty Acid Composition | Distillers Corn Oil (DCO) | DCO Light Phase Fraction | DCO Heavy Phase Fraction | High Ethyl Ester Corn Oil (HEECO) | HEECO Light Phase Fraction | HEECO Heavy Phase Fraction | Units |
|---|---|---|---|---|---|---|---|
| Total Omega 6 | 484.60 | 493.20 | 447.00 | 448.40 | 461.00 | 364.10 | mg FA/g |
| Total Omega 9 | 251.30 | 256.90 | 234.30 | 237.30 | 277.30 | 195.10 | mg FA/g |
| Free Fatty Acids as Oleic | 4.51 | 6.82 | 11.90 | 7.01 | 8.42 | 14.30 | % |

TABLE 8

| Mono & Diglycerids by HPLC | Distillers Corn Oil (DCO) | DCO Light Phase Fraction | DCO Heavy Phase Fraction | High Ethyl Ester Corn Oil (HEECO) | HEECO Light Phase Fraction | HEECO Heavy Phase Fraction | Units |
|---|---|---|---|---|---|---|---|
| Diglycerides | 3.23 | 2.96 | 3.15 | 5.29 | 5.35 | 4.30 | % (w/w) |
| Monoglycerides | 0.06 | 0.07 | 0.19 | 0.36 | 0.37 | 0.39 | % (w/w) |
| Soaps | 1,170.00 | 311.00 | 8,880.00 | 20,700.00 | 877.00 | 213,000.00 | ppm |
| Total Waxes | | | 893 | | | 215 | mg/Kg |

FIG. 6

Example 6

Figure 7A:
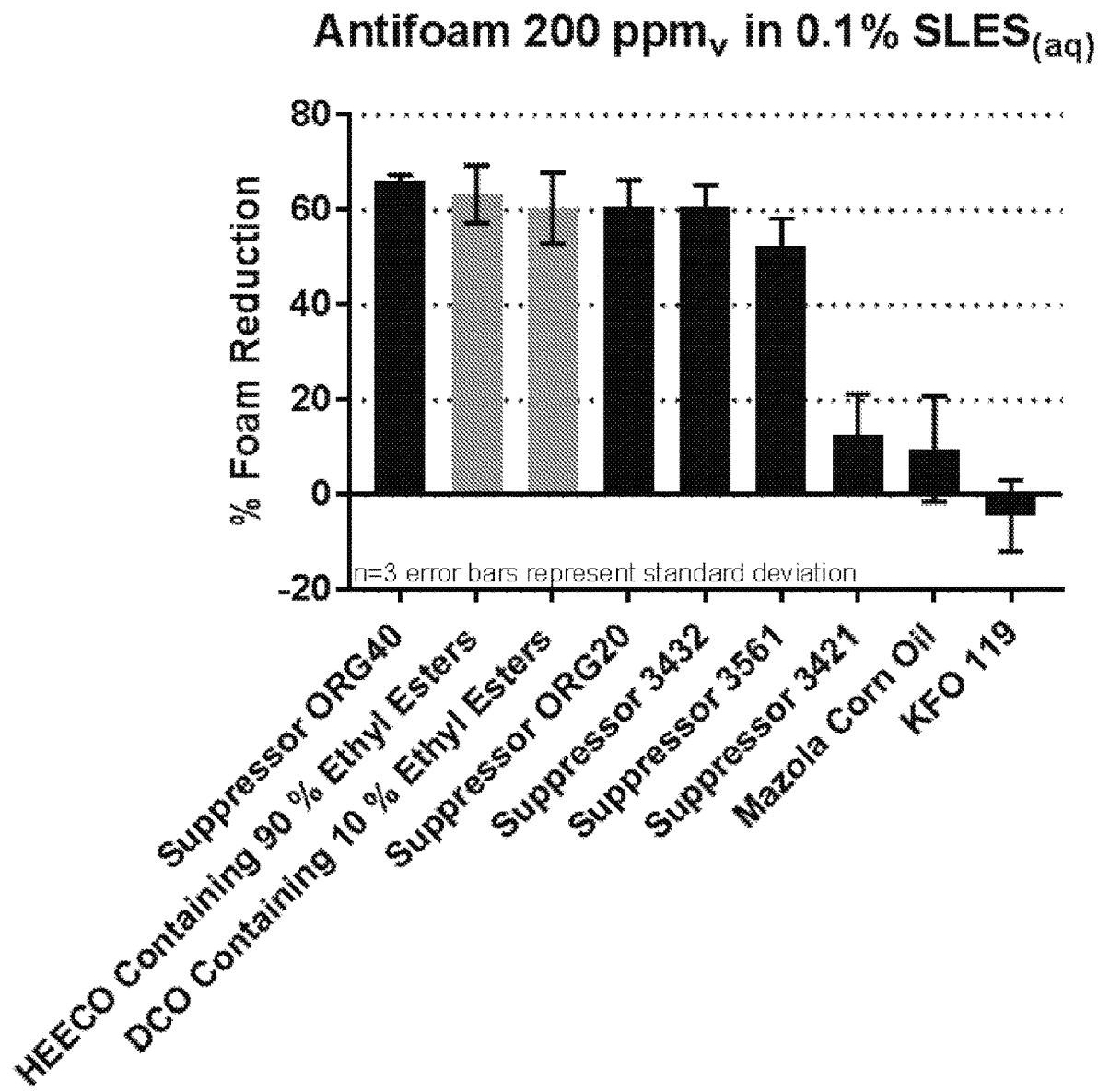
FIG. 7A illustrates data from Example 6 and shows the volumetric percent foam reduction for a grain oil composition containing 90% ethyl esters, a grain oil composition containing 10% ethyl esters, six commercially available antifoam products, and food-grade refined Mazola corn oil when using a model substrate (0.1 mass % SLES in water)

FIG. 7A shows the volume percent foam reduction for a HEECO sample containing 90% ethyl esters, a DCO sample containing 10% ethyl esters, six commercially available antifoam products, and food-grade, refined Mazola corn oil.

The HEECO containing 90% ethyl esters described herein was produced by combining DCO with ethanol in the presence of lipase. The data in FIG. 7A was generated by following the antifoam testing procedure, outlined above. An aqueous solution of sodium lauryl ether sulfate (SLES) was used as substrate. The aqueous solution of SLES contained 0.1 mass % SLES in water. Antifoam was added at a dose rate of 200 ppmv.

Figure 7B:
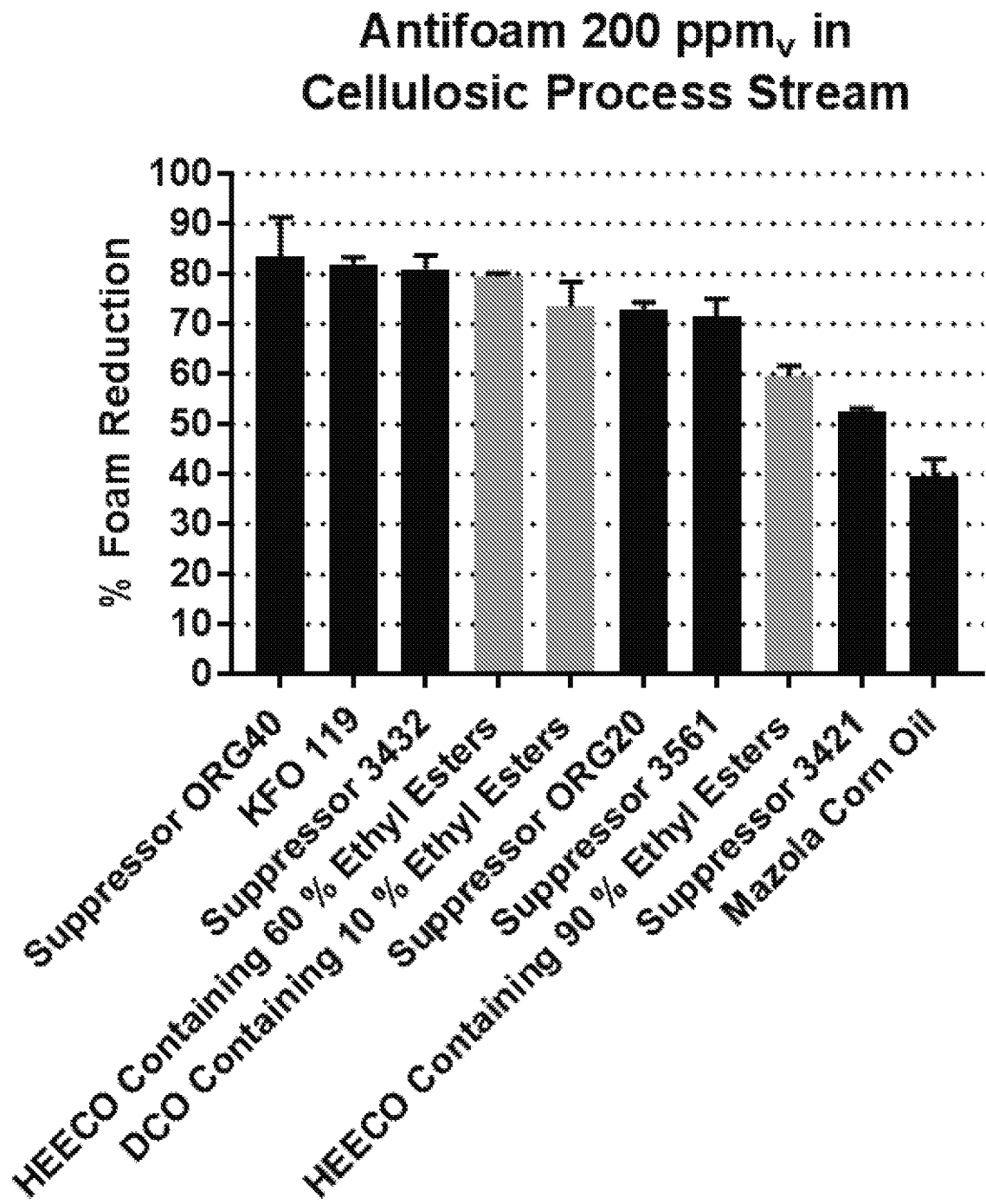
FIG. 7B illustrates data from Example 6 and shows the volumetric percent foam reduction for a grain oil composition containing 90% ethyl esters, a grain oil composition containing 60% ethyl esters, a grain oil composition containing 10% ethyl esters, six commercially available antifoam products, and food-grade refined Mazola corn oil when using evaporated thin stillage from a cellulosic ethanol facility as substrate.

FIG. 7B shows the volume percent foam reduction for a HEECO sample containing 90% ethyl esters, a HEECO sample containing 60% ethyl esters, a DCO sample containing 10% ethyl esters, six commercially available antifoam products, and food-grade, refined Mazola corn oil. The data in FIG. 7B was generated by following the antifoam testing procedure, outlined above except using an evaporated thin stillage sample from a cellulosic ethanol facility as substrate. Antifoam was added at a dose rate of 200 ppmv when generating the data shown in FIG. 7B.

Example 7

Example 7 measured Brookfield viscosity of various corn oil samples using a Brookfield viscometer having model number DV2TLVTJ0 at the conditions identified in Table 9 below and using a small sample adapter to maintain the temperature of the sample at 22 C using a water bath.

TABLE 9

| | Heeco Heavy | 50% Heeco Heavy + 50% Mineral Oil | 25% Heeco Heavy + 75% Mineral Oil | Heeco | Heeco Light | DCO Heavy | DCO | DCO Light |
|---|---|---|---|---|---|---|---|---|
| Viscosity (centiPoise) | 165.9-169.2 | 37.8-38.4 | 24.96-25.11 | 41.94-42.84 | 17.10-17.16 | 224.7-232.2 | 60.0-63.0 | 39.3-39.9 |
| RPM | 100 | 100 | 100 | 50 | 100 | 100 | 100 | 100 |
| Spindle | 31 | 31 | 18 | 18 | 18 | 31 | 31 | 31 |
| Temperature ° C. | 22 | 22 | 22 | 22 | 22 | 22 | 22 | 22 |

Example 8

Figure 8A:
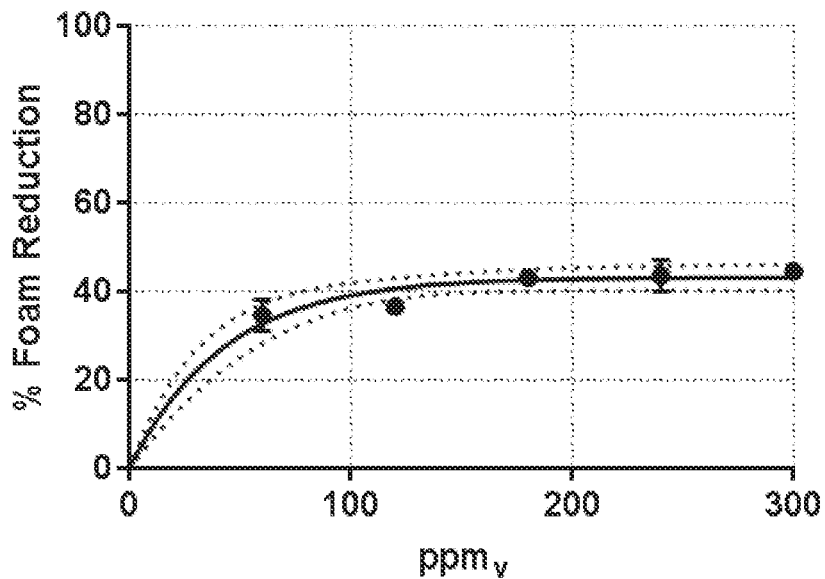
FIGS. 8A through 8G illustrate data from Example 8 and show that corn oil based antifoam compositions were effective at reducing foam in a sample of evaporated thin stillage from a cellulosic ethanol facility.
Figure 8B:
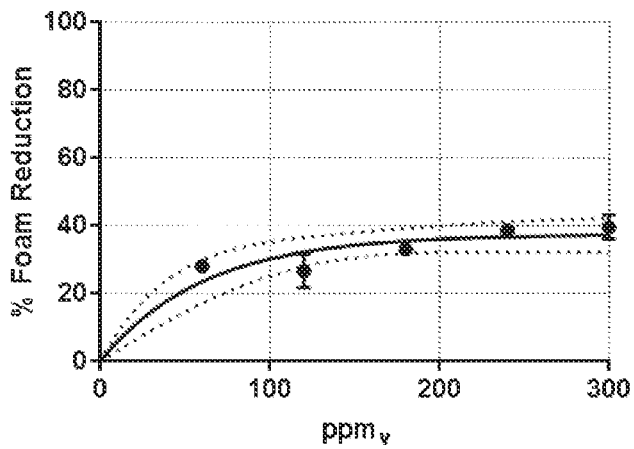
Figure 8C:
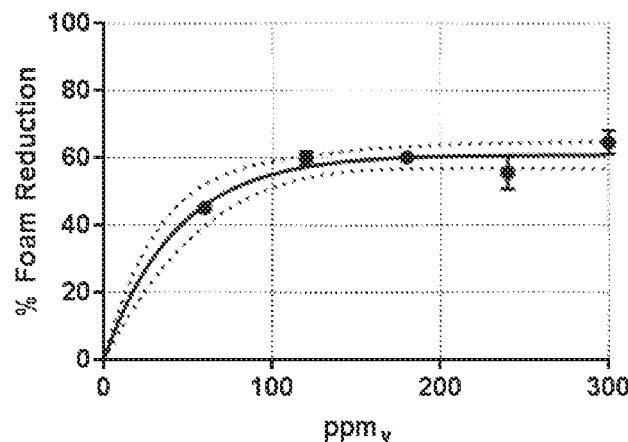
Figure 8D:
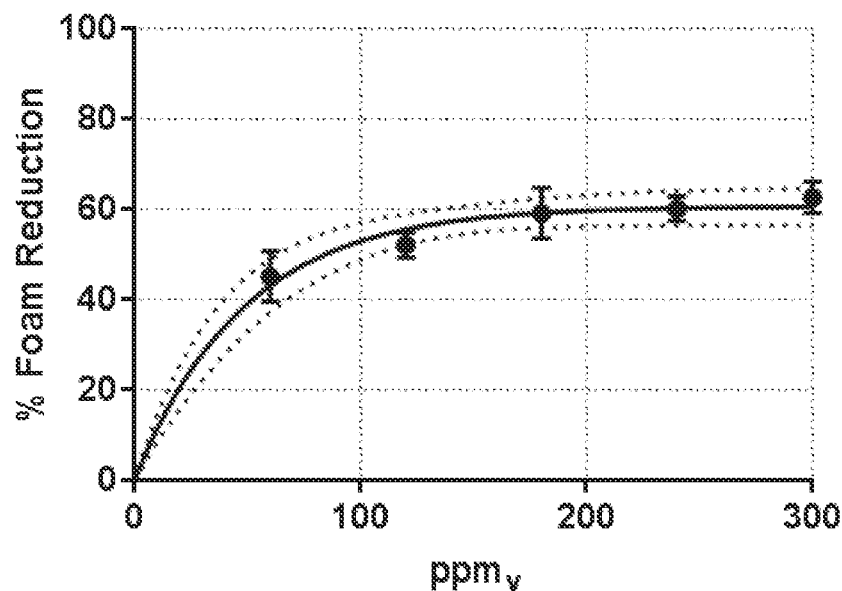
Figure 8E:
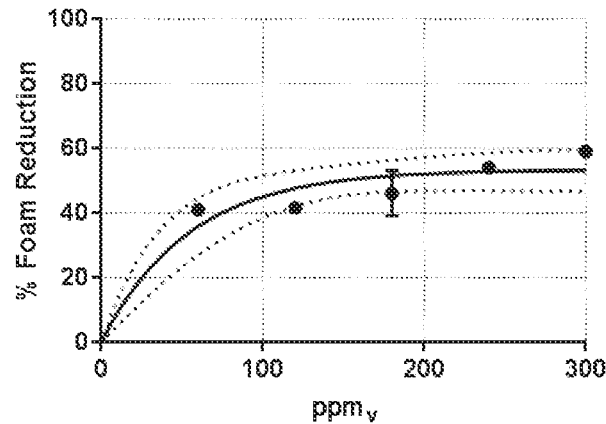
Figure 8F:
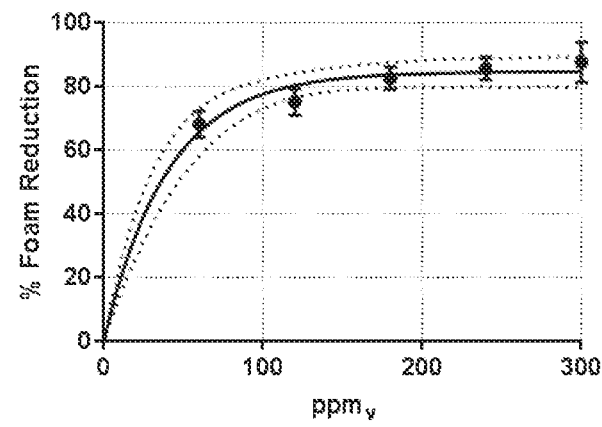
Figure 8G:
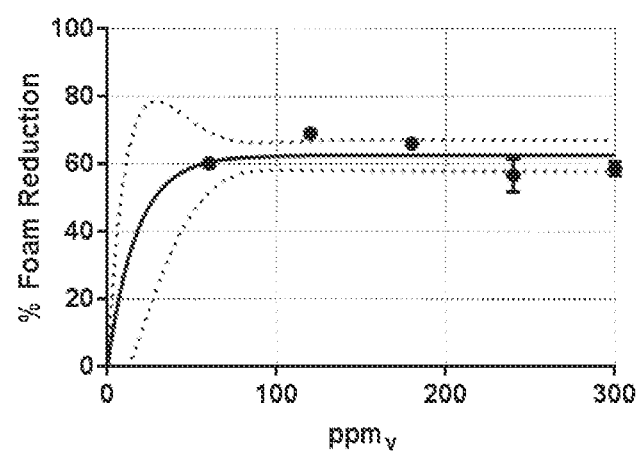

The sample of DCO in FIGS. 8A-C is the same sample as in FIG. 7B, but was performed on a different day using a different foaming cellulosic substrate. The sample of HEECO used in FIGS. 8D-8G is a different sample than that used in FIG. 7B. DCO, DCO light phase fraction, DCO heavy phase fraction, HEECO, HEECO light phase fraction, HEECO heavy phase fraction, and HEECO heavy phase fraction mixed with mineral oil may be effective in reducing foam at cellulosic ethanol biorefineries, e.g. reducing foaming when concentrating liquids after solid liquid separation of cellulosic stillage. For example, the data in FIGS. 8A through 8G show that these corn oil based antifoams are effective at reducing foam in a sample of evaporated thin stillage from a cellulosic ethanol facility. The HEECO used to generate the data in FIGS. 8D through 8G contained approximately 60% ethyl esters. The antifoam testing procedure, outlined above, was used to generate the data shown in FIGS. 8A through 8G and an evaporated thin stillage sample from a cellulosic ethanol facility was used as substrate.

Table 10 is a table that shows the volume percent foam reduction. The values in Table 10 are the point at which the curves in FIGS. 8A through 8G plateau.

TABLE 10

| | Distillers Corn Oil (DCO) | DCO Light Phase Fraction | DCO Heavy Phase Fraction | High Ethyl Ester Corn Oil (HEECO) | HEECO Light Phase Fraction | HEECO Heavy Phase Fraction | HEECO Heavy Phase/ Mineral Oil Mix |
|---|---|---|---|---|---|---|---|
| Volume % Foam Reduction (Plateau) | 43.1 | 37.34 | 60.9 | 60.58 | 53.33 | 84.54 | 62.41 |

Example 9

An experiment was conducted with oils from different sources as a carrier oil in an anti-foam composition. Each anti-foam composition was prepared by adding an amount of "anti-foam" additive to the carrier oil. For each carrier oil from a given source, the amount of anti-foam additive was varied from 0 weight percent, 6 weight percent, and 12 weight percent based on the total weight of anti-foam composition. The anti-foam additive used in these tests was a 50:50 mixture of Dumacil® 100 FGK hydrophobic silica powder and Dumacil® 300 FGK hydrophobic silica powder, both of which are commercially available. Each resulting anti-foam composition was tested and analyzed for its anti-foam characteristics using a Ross Miles Foam Analyzer (RMFA) in accordance with ASTM D 1173. The test used a 0.1% solution of sodium lauryl ether sulfate (SLES) to generate a foam. Each anti-foam composition was dosed at 200 ppm. All results are n=4 with error bars representing standard deviation.

Figure 9:
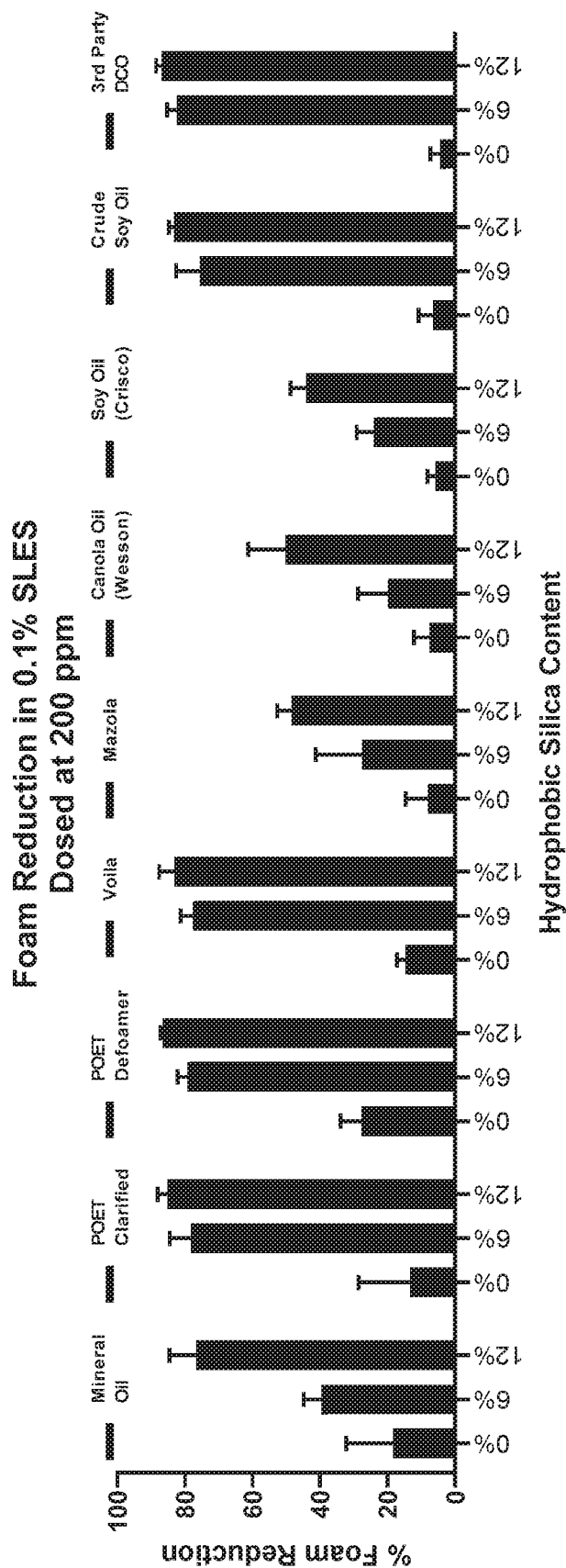
FIG. 9 illustrates data from Example 9 as described below.

In FIG. 9, "POET clarified" and "POET defoamer" are examples of grain oils that were recovered post-distillation from a dry-grind corn ethanol process using the water refining process described herein with respect to FIG. 1 and related text. "POET clarified" refers to the light phase (corn oil product) and "POET defoamer" refers to the heavy phase (emulsion phase). "Voila®" corn oil is also an example of a grain oil that was also recovered post-distillation from a dry-grind corn ethanol process. The "Voila®" corn oil was made using a raw starch conversion process as described in U.S. Pat. No. 7,842,484 (Lewis) and U.S. Pat. No. 7,919,291 (Lewis et al.). "3$^{rd}$ party DCO" means third party distiller's corn oil that used a jet-cooking process to convert starch to glucose and was recovered post-distillation from a corn ethanol process, and is another example of a crude vegetable oil. The Mazola® corn oil, Wesson® canola oil, and Crisco® soy oil are examples of refined vegetable oil.

As shown in FIG. 9, some oils can provide surprisingly more effective foam control when combined with hydrophobic particles such as hydrophobic silica particles, as compared to other oils (e.g., oils that have been treated to remove components such as, e.g., fatty acids), and/or as compared to mineral oil. While not being bound by theory, it is believed that one or more components that are present (endogenously present and/or chemically formed in-situ during processing of the oil) in grain oil can enhance its anti-foam characteristic. For example, free fatty acids and/or fatty acid ethyl esters can be generated during ethanol production and are present at levels not present in many food grade oils. For example, one or more processes of refining (e.g., alkali refining), deodorizing, and the like may remove free fatty acids to form refined oil, thereby reducing the anti-foam characteristic of the refined vegetable oil.

Also, while not being bound by theory, it is believed that one or more fatty acid ethyl esters present in crude vegetable oil (endogenously present and/or chemically formed in-situ during processing of the oil) may enhance its anti-foam performance as compared to other crude vegetable oils that do not have any or a lower amount of one or more endogenous fatty acid alkyl esters.

Example 10

Example 10 shows compositional analysis of various corn oils. In FIG. 10, "Voila" refers Voila® corn oil, which is a distiller's corn oil and is made in a manner similar to grain oil composition feedstock 317 in FIG. 3. "Clarified Voila" refers to the light phase (corn oil product) and "Voila dehydrated chilled solids" refers to a dehydrated heavy phase (dehydrated emulsion phase) produced via water refining similar to that described above with respect to FIGS. 1 and 4.

| Test | Analyte | Unit | Voila | Voila Dehydrated Chilled Solids | Mazola Corn Oil | Clarified Voila | Crude Soy Oil | 3rd Party DCO |
|---|---|---|---|---|---|---|---|---|
| Ash | Ash | ppm | <1 | <1 | 16.0 | <1 | <1 | <1 |
| Brookfield Viscosity @20° C. | Viscosity | cP | 55.57 | 74.60 | 60.75 | 44.90 | 45.40 | 54.03 |
| Caloric Value | Caloric Value | cal/100 g | 898.4 | 898.7 | 899.9 | 898.4 | 899.2 | 897.4 |
| Carotenes | Alpha Carotene | mcg/g | 0.2 | 0.2 | <0.200 | 0.4 | | 1.4 |
| Carotenes | Beta Carotene | mcg/g | 4.8 | 3.2 | <0.200 | 5.6 | | 16.5 |
| Carotenes | Trans Beta Carotene | mcg/g | 2.2 | 1.3 | <0.200 | 2.4 | | 7.0 |
| Cloud Point | Cloud Point | ° C. | 3.2 | 6.5 | −10.0 | −10.0 | −10.2 | −10.0 |
| Color | 1" Lovibond Red | | 12.2 | 12.0 | 3.4 | 13.1 | 3.9 | 20.0 |
| Color | 1" Lovibond Yellow | | 70.0 | 70.0 | 50.0 | 70.0 | 70.0 | 50.0 |
| Density @20° C. | Density | g/cm^3 | 0.9142 | 0.9150 | 0.9194 | 0.9150 | 0.9249 | 0.9161 |
| Elemental Analysis | Arsenic | ppm | ND | ND | ND | ND | ND | ND |
| Elemental Analysis | Cadmium | ppm | ND | ND | ND | ND | 0.5 | ND |
| Elemental Analysis | Calcium | ppm | 8.3 | 24.3 | ND | ND | 63.7 | ND |
| Elemental Analysis | Chlorides | % | 0.1 | 0.0 | 0.1 | 0.1 | 0.0 | 0.0 |
| Elemental Analysis | Copper | ppm | | 0.0 | | | | |
| Elemental Analysis | Iron | ppm | | 9.5 | | | | |
| Elemental Analysis | Lead | ppm | ND | ND | ND | ND | ND | ND |
| Elemental Analysis | Magnesium | ppm | 42.9 | 421.0 | ND | ND | 89.7 | ND |
| Elemental Analysis | Manganese | ppm | | 2.3 | | | | |
| Elemental Analysis | Mercury | ppm | ND | ND | ND | ND | ND | ND |
| Elemental Analysis | Nitrogen | ppm | ND | 0.0 | ND | ND | 0.0 | ND |
| Elemental Analysis | Phosphorus | ppm | 28.6 | 94.1 | 0.3 | 2.0 | 1240.0 | 2.4 |
| Elemental Analysis | Potassium | ppm | 23.8 | 87.3 | 4.1 | 7.2 | 718.0 | 8.7 |
| Elemental Analysis | Sodium | ppm | 71.8 | 412.0 | ND | 1.9 | ND | 1.9 |
| Elemental Analysis | Sulfur | ppm | 19.5 | 38.0 | 4.2 | 16.3 | 16.1 | 28.2 |
| Elemental Analysis | Zinc | ppm | | 0.0 | | | | |
| Fatty Acid Ethyl Esters | Ethyl Linoleate | mass % | 5.41 | 4.95 | 0 | 4.07 | 0 | 2.85 |
| Fatty Acid Ethyl Esters | Ethyl Linolenate | mass % | 0.08 | 0.09 | 0 | 0.06 | 0 | 0.03 |
| Fatty Acid Ethyl Esters | Ethyl Oleate | mass % | 1.92 | 1.68 | 0 | 1.26 | 0 | 0.67 |
| Fatty Acid Ethyl Esters | Ethyl Palmitate | mass % | 3.05 | 2.73 | 0 | 2.38 | 0 | 1.13 |
| Fatty Acid Ethyl Esters | Ethyl Stearate | mass % | 0.15 | 0.13 | 0 | 0.08 | 0 | 0 |
| Fatty Acid Ethyl Esters | Total Fatty Acid Ethyl Esters | mass % | 10.62 | 9.59 | 0 | 7.84 | 0 | 4.68 |
| Fatty Acid Profile | Arachidic | mg/g | 4.0 | 4.0 | 3.9 | 4.1 | | 3.6 |
| Fatty Acid Profile | Behenic | mg/g | 1.9 | 2.1 | 1.4 | 1.6 | | 1.7 |
| Fatty Acid Profile | Capric | mg/g | 0.0 | 0.0 | 0.0 | 0.0 | | 0.0 |
| Fatty Acid Profile | Caproic | mg/g | 0.0 | 0.0 | 0.0 | 0.0 | | 0.0 |
| Fatty Acid Profile | Caprylic | mg/g | 0.0 | 0.0 | 0.0 | 0.0 | | 0.0 |
| Fatty Acid Profile | Eicosenoic | mg/g | 2.7 | 2.7 | 2.7 | 2.6 | | 2.6 |
| Fatty Acid Profile | Erucic | mg/g | 0.7 | 0.7 | 0.4 | 0.5 | | 0.4 |
| Fatty Acid Profile | Lauric | mg/g | 0.1 | 0.1 | 0.0 | 0.1 | | 0.0 |
| Fatty Acid Profile | Lauroleic | mg/g | 0.0 | 0.0 | 0.0 | 0.0 | | 0.0 |
| Fatty Acid Profile | Lignoceric | mg/g | 2.1 | 2.5 | 1.6 | 2.1 | | 2.2 |
| Fatty Acid Profile | Linoleic + Isomers | mg/g | 539.2 | 532.6 | 553.4 | 541.6 | | 551.2 |
| Fatty Acid Profile | Linolenic, gamma | mg/g | 0.0 | 0.0 | 0.0 | 0.0 | | 0.0 |
| Fatty Acid Profile | Linolenic, alpha | mg/g | 13.5 | 13.4 | 8.9 | 13.5 | | 13.6 |
| Fatty Acid Profile | Margaric | mg/g | 0.7 | 0.7 | 0.7 | 0.7 | | 0.7 |
| Fatty Acid Profile | Margaroleic | mg/g | 0.3 | 0.3 | 0.3 | 0.3 | | 0.3 |
| Fatty Acid Profile | Myristic | mg/g | 0.6 | 0.6 | 0.3 | 0.6 | | 0.4 |
| Fatty Acid Profile | Myristoleic | mg/g | 0.0 | 0.0 | 0.0 | 0.0 | | 0.0 |
| Fatty Acid Profile | Oleic + Isomers | mg/g | 277.5 | 279.1 | 290.9 | 277.4 | | 266.9 |
| Fatty Acid Profile | Other Fatty Acids | mg/g | 0.2 | 0.3 | 0.1 | 0.1 | | 0.1 |
| Fatty Acid Profile | other isomers | mg/g | 0.0 | 0.0 | 0.0 | 0.0 | | 0.0 |
| Fatty Acid Profile | Palmitic | mg/g | 135.0 | 138.5 | 115.3 | 133.1 | | 136.0 |
| Fatty Acid Profile | Palmitoleic] | mg/g | 1.2 | 1.2 | 0.9 | 1.2 | | 1.0 |
| Fatty Acid Profile | Pentadadecylic | mg/g | 0.0 | 0.0 | 0.0 | 0.0 | | 0.0 |
| Fatty Acid Profile | Pentadadecyloleic | mg/g | 0.0 | 0.0 | 0.0 | 0.0 | | 0.0 |
| Fatty Acid Profile | Stearic | mg/g | 19.5 | 20.3 | 16.6 | 19.4 | | 18.1 |
| Fatty Acid Profile | Stearidonic | mg/g | 0.0 | 0.0 | 0.0 | 0.0 | | 0.0 |
| Fatty Acid Profile | Tetracosenoic | mg/g | 0.8 | 0.9 | 2.6 | 1.1 | | 1.2 |
| Flash Point | Flash Point | ° F. | 420.0 | 407.0 | >550 | 430.0 | 575.0 | 417.0 |
| Free Fatty Acid | Free Fatty Acid (Oleic) | % | 4.0 | 14.8 | 0.1 | 3.9 | 0.5 | 12.7 |
| Free Glycerol | Glycerol | % | <0.05 | 0.1 | <0.05 | <0.05 | <0.05 | 0.1 |
| Glycerides | Diglycerides | % | 5.49 | 14.9 | 3.2 | 5.3 | 2.1 | 13.0 |
| Glycerides | Monoglycerides | % | 0.64 | 5.3 | 0.8 | 0.7 | 3.4 | 2.3 |

| Test | Analyte | Unit | Voila | Voila Dehydrated Chilled Solids | Mazola Corn Oil | Clarified Voila | Crude Soy Oil | 3rd Party DCO |
|---|---|---|---|---|---|---|---|---|
| Glycerides | Triglycerides | % | 82.06 | 78.3 | 86.7 | 81.1 | 86.0 | 75.5 |
| Insoluble Impurities | Insolubles | % | 0.0 | 0.1 | 0.0 | 0.0 | 0.0 | 0.0 |
| Iodine Value | Iodine | | 119.7 | 118.8 | 123.2 | 121.8 | 133.3 | 120.6 |
| Moisture | Moisture (K/F) | % | 0.2 | 0.1 | 0.0 | 0.2 | 0.1 | 0.3 |
| Oxadative Stability Index | OSI | hours | 8.5 | 3.1 | 5.0 | 8.6 | | 9.0 |
| p-Anisidine Value | p-Anisidine Value | | 22.8 | 21.7 | 10.6 | 21.4 | 0.6 | 22.7 |
| Peroxide Value | Peroxide | meq/kg | 0.2 | 2.5 | 28.5 | 0.0 | 0.0 | 0.3 |
| Pour Point | Pour Point | °C. | −6.8 | 2.3 | −8.1 | −9.3 | −6.8 | −10.6 |
| Smoke Point | Smoke Point | °F. | 360.0 | 313.0 | 493.0 | 320.0 | 460.0 | 300.0 |
| Soaps | Soap as Sodium Oleate | ppm | 1717.0 | 7983.0 | <1 | <1 | 438.0 | <1 |
| Sterols | 24-methylene-cholesterol | % | 0.8 | 0.6 | 0.9 | 0.7 | 0.2 | 0.4 |
| Sterols | Apparent β-Sitosterol | | 69.7 | 71.0 | 71.5 | 69.5 | 55.6 | 72.2 |
| Sterols | Brassicaserol | % | 0.1 | 0.0 | 0.0 | 0.0 | 0.1 | 0.0 |
| Sterols | Campestanol | % | 5.4 | 5.9 | 1.3 | 6.0 | 0.5 | 5.2 |
| Sterols | Campesterol | % | 16.7 | 15.4 | 18.5 | 16.7 | 23.7 | 15.2 |
| Sterols | Cholesterol | % | 0.3 | 0.7 | 0.3 | 0.2 | 0.3 | 0.1 |
| Sterols | Clerosterol | % | 0.9 | 0.7 | 0.7 | 0.9 | 0.3 | 0.8 |
| Sterols | Erythrodiol | % | 0.0 | 0.0 | 0.0 | 0.0 | 0.0 | 0.0 |
| Sterols | Sitostanol | % | 14.6 | 5.4 | 3.5 | 3.4 | 0.0 | 16.2 |
| Sterols | Stigmasterol | % | 4.7 | 4.3 | 6.2 | 4.5 | 16.2 | 4.6 |
| Sterols | Total Sterols | % | 1.9 | 1.9 | 1.1 | 1.9 | 0.5 | 2.4 |
| Sterols | Total Sterols | ppm | 19145.0 | 18763.0 | 11293.0 | 19339.0 | 4589.0 | 23653.0 |
| Sterols | Uvaol | % | 0.0 | 0.0 | 0.0 | 0.0 | 0.0 | 0.0 |
| Sterols | β-sitosterol | % | 50.0 | 49.3 | 64.4 | 48.7 | 0.7 | 50.7 |
| Sterols | Δ-5,23-stigmastadienol | % | 0.5 | 0.9 | 0.2 | 0.4 | 0.4 | 0.4 |
| Sterols | Δ5,24-stigmasadienol | % | 0.6 | 0.3 | 0.4 | 0.5 | 0.8 | 0.6 |
| Sterols | Δ-5-avenasterol | % | 3.2 | 14.4 | 2.4 | 15.5 | 2.2 | 3.5 |
| Sterols | Δ-7-Avenasterol | % | 1.1 | 1.0 | 0.6 | 1.2 | 1.3 | 1.2 |
| Sterols | Δ-7-Campesterol | % | 0.4 | 0.3 | 0.3 | 0.3 | 0.6 | 0.3 |
| Sterols | Δ-7-Stigmastenol | % | 1.0 | 0.7 | 0.4 | 1.0 | 1.5 | 0.9 |
| Tocopherol/Tocotrienols | Total Tocopherols | ppm | 491.5 | 419.5 | 560.8 | 610.4 | 1008.2 | 884.4 |
| Tocopherol/Tocotrienols | Total Tocotrienols | ppm | 436.1 | 435.5 | ND | 361.3 | ND | 536.7 |
| Tocopherol/Tocotrienols | Total Vitamin E | ppm | 927.6 | 855.0 | 560.8 | 971.7 | 1008.2 | 1421.1 |
| Tocopherol/Tocotrienols | α-tocopherol | ppm | 140.8 | 109.6 | 170.5 | 175.2 | 104.1 | 274.6 |
| Tocopherol/Tocotrienols | α-Tocotrienol | ppm | 151.4 | 217.6 | ND | 169.5 | ND | 201.8 |
| Tocopherol/Tocotrienols | β-tocopherol | ppm | ND | ND | ND | ND | 23.5 | 292.5 |
| Tocopherol/Tocotrienols | β-Tocotrienol | ppm | ND | ND | ND | ND | ND | ND |
| Tocopherol/Tocotrienols | γ-tocopherol | ppm | 350.7 | 275.4 | 330.8 | 394.3 | 495.7 | 277.0 |
| Tocopherol/Tocotrienols | γ-Tocotrienol | ppm | 284.7 | 217.9 | ND | 191.9 | ND | 334.9 |
| Tocopherol/Tocotrienols | δ-tocopherol | ppm | ND | 34.5 | 59.4 | 40.9 | 384.9 | 40.5 |
| Tocopherol/Tocotrienols | δ-Tocotrienol | ppm | ND | ND | ND | ND | ND | ND |
| Trans Fat | Trans Fat | % | 0.1 | 0.1 | 0.2 | 0.1 | 0.0 | 0.1 |
| Unsaponifiables Mater | Unsaponifiables | % | 1.9 | 1.7 | 0.9 | 2.0 | 0.5 | 2.1 |

What is claimed is:

1. A method of recovering a byproduct of a grain oil composition feedstock from distillers corn oil, the method comprising:
   recovering whole stillage from distillation of a grain feedstock;
   separating the whole stillage into wet cake and thin stillage;
   processing the thin stillage in a separator to recover a grain oil composition feedstock;
   cooling the grain oil composition feedstock to form a temperature adjusted grain oil composition feedstock including a grain oil product and a byproduct of the grain oil composition feedstock;
   recovering the byproduct of the grain oil composition feedstock; and
   wherein the byproduct of the grain oil composition feedstock is any fraction or phase separated from the temperature adjusted grain oil composition feedstock other than the grain oil product.

2. The method of recovering a byproduct of a grain oil composition feedstock from distillers corn oil of claim 1, wherein the temperature adjusted grain oil composition feedstock is agitated to form the grain oil product and the byproduct of the grain oil composition feedstock.

3. The method of recovering a byproduct of a grain oil composition feedstock from distillers corn oil of claim 2, wherein the cooling is before the agitation.

4. The method of recovering a byproduct of a grain oil composition feedstock from distillers corn oil of claim 1, wherein the byproduct of the grain oil composition feedstock is a solid.

5. The method of recovering a byproduct of a grain oil composition feedstock from distillers corn oil of claim 1, wherein the byproduct of the grain oil composition feedstock is combined with a liquid stillage stream.

6. A method of recovering a byproduct of a grain oil composition feedstock from distillers corn oil of claim 5, wherein the liquid stillage stream is whole stillage.

7. The method of recovering a byproduct of a grain oil composition feedstock from distillers corn oil of claim 1, wherein an amount of water is combined with the grain oil composition feedstock before the cooling.

8. The method of recovering a byproduct of a grain oil composition feedstock from distillers corn oil of claim 1, wherein an amount of water is combined with the grain oil composition feedstock simultaneously with the cooling.

9. The method of recovering a byproduct of a grain oil composition feedstock from distillers corn oil of claim 1, wherein an amount of water is combined with the grain oil composition feedstock before the agitation.

10. The method or recovering a byproduct of a grain oil composition feedstock from distillers corn oil of claim 9, wherein the water is cooler than the grain oil composition feedstock.

11. The method of recovering a byproduct of a grain oil composition feedstock from distillers corn oil of claim 1, wherein a level of impurities in the grain oil product is less than the level of impurities in the byproduct of the grain oil composition feedstock.

12. The method of recovering a byproduct of a grain oil composition feedstock from distillers corn oil, of claim 11, wherein the impurities include one or more of the aluminum, arsenic, cadmium, calcium, chlorides, chromium, copper, iron, lead, magnesium, manganese, mercury, nitrogen, nickel, phosphorus, potassium, silicon, sodium, sulfur, vanadium, zinc, or combinations thereof.

13. The method of recovering a byproduct of a grain oil composition feedstock from distillers corn oil of claim 1, wherein the grain oil composition feedstock includes free fatty acids generated during the distillation.

14. The method of recovering a byproduct of a grain oil composition feedstock from distillers corn oil of claim 13, wherein the grain oil composition feedstock includes about 1 to about 15 percent of the free fatty acids.

15. The method of recovering a byproduct of a grain oil composition feedstock from distillers corn oil of claim 1, wherein the byproduct of the grain oil composition feedstock is recovered by separating the byproduct of the grain oil composition feedstock from the grain oil product by using one or more of a settling tank, a cooled settling tank, decanting, a decanter centrifuge, a disk stack centrifuge, a cooled disk stage centrifuge, a screen centrifuge, a hydrocyclone, a filter press, a rotary drum filter, or combinations thereof.

16. A method of recovering a grain oil product low in impurities from distillers corn oil, the method comprising:
recovering whole stillage from distillation of a grain feedstock;
separating the whole stillage into wet cake and thin stillage;
processing the thin stillage in a separator to recover a grain oil composition feedstock;
cooling the grain oil composition feedstock to form a temperature adjusted grain oil composition feedstock including a grain oil product and a byproduct of the grain oil composition feedstock, wherein the byproduct of the grain oil composition feedstock is any fraction or phase separated from the temperature adjusted grain oil composition feedstock other than the grain oil product; and
recovering the grain oil product and wherein a level of impurities in the grain oil product is less than a level of impurities in the grain oil composition feedstock.

17. The method of recovering a grain oil product low in impurities from distillers corn oil of claim 16, wherein the temperature adjusted grain oil composition feedstock is agitated to form the grain oil product and the byproduct of the grain oil composition feedstock.

18. The method of recovering a grain oil product low in impurities from distillers corn oil of claim 17, wherein the cooling is before the agitation.

19. The method of recovering a grain oil product low in impurities from distillers corn oil of claim 16, wherein an amount of water is combined with the grain oil composition feedstock before the cooling.

20. The method of recovering a grain oil product low in impurities from distillers corn oil of claim 16, wherein an amount of water is combined with the grain oil composition feedstock simultaneously with the cooling.

21. The method of recovering a grain oil product low in impurities from distillers corn oil of claim 17, wherein an amount of water is combined with the grain oil composition feedstock before the agitation.

22. The method of recovering a grain oil product low in impurities from distillers corn oil of claim 21, wherein the water is cooler than the grain oil composition feedstock.

23. The method of recovering a grain oil product low in impurities from distillers corn oil of claim 16, wherein the impurities include one or more of the aluminum, arsenic, cadmium, calcium, chlorides, chromium, copper, iron, lead, magnesium, manganese, mercury, nitrogen, nickel, phosphorus, potassium, silicon, sodium, sulfur, vanadium, zinc, or combinations thereof.

24. The method of recovering a grain oil product low in impurities from distillers corn oil of claim 16, wherein the grain oil composition feedstock includes free fatty acids generated during the distillation.

25. The method of recovering a grain oil product low in impurities from distillers corn oil of claim 24, wherein the grain oil composition feedstock includes about 1 to about 15 percent of the free fatty acids.

26. The method of recovering a grain oil product low in impurities from distillers corn oil of claim 16, wherein the grain oil product is recovered by separating the grain oil product from a byproduct of the grain oil composition feedstock using one or more of a settling tank, a cooled settling tank, decanting, a decanter centrifuge, a disk stack centrifuge, a cooled disk stage centrifuge, a screen centrifuge, a hydrocyclone, a filter press, a rotary drum filter, or combinations thereof.

* * * * *